(12) United States Patent
Toyodome et al.

(10) Patent No.: US 11,711,040 B2
(45) Date of Patent: Jul. 25, 2023

(54) MOTOR DRIVING APPARATUS AND REFRIGERATION CYCLE EQUIPMENT

(71) Applicant: Mitsubishi Electric Corporation, Tokyo (JP)

(72) Inventors: Shinya Toyodome, Tokyo (JP); Kazunori Hatakeyama, Tokyo (JP); Kenji Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 125 days.

(21) Appl. No.: 17/428,683

(22) PCT Filed: Feb. 21, 2019

(86) PCT No.: PCT/JP2019/006486
§ 371 (c)(1),
(2) Date: Aug. 5, 2021

(87) PCT Pub. No.: WO2020/170379
PCT Pub. Date: Aug. 27, 2020

(65) Prior Publication Data
US 2022/0115973 A1    Apr. 14, 2022

(51) Int. Cl.
*H02P 25/18* (2006.01)
*H02P 21/20* (2016.01)
*H02P 21/22* (2016.01)
*F25B 31/02* (2006.01)
*H02P 27/12* (2006.01)

(52) U.S. Cl.
CPC .......... *H02P 25/184* (2013.01); *F25B 31/026* (2013.01); *H02P 21/20* (2016.02); *H02P 21/22* (2016.02); *H02P 27/12* (2013.01); *H02P 2207/05* (2013.01)

(58) Field of Classification Search
CPC ........ H02P 25/184; H02P 21/20; H02P 21/22; H02P 27/12; H02P 2207/05; H02P 6/10; H02P 2205/05; F25B 31/026; F25B 13/00; F25B 2600/021; Y02B 30/70
USPC .............................. 318/400.02, 400.01, 700
See application file for complete search history.

(56) References Cited

U.S. PATENT DOCUMENTS

| | | | | |
|---|---|---|---|---|
| 6,108,179 | A * | 8/2000 | Katae | B25J 19/06 361/33 |
| 8,558,500 | B2 * | 10/2013 | Yamakawa | H02P 23/0027 363/131 |
| 9,077,269 | B2 * | 7/2015 | Nakamura | H02M 3/1582 |
| 10,411,634 | B2 * | 9/2019 | Pramod | B62D 5/046 |

FOREIGN PATENT DOCUMENTS

JP          2016-86587 A       5/2016

* cited by examiner

*Primary Examiner* — David Luo
(74) *Attorney, Agent, or Firm* — Posz Law Group, PLC

(57) ABSTRACT

An inverter for driving a motor that has a switchable connection of windings and drives a load element having a periodically varying load torque is provided. The inverter is controlled so that an output torque of the motor follows the periodic variation of the load torque. The inverter is controlled so that a current flowing through the motor is zero during a period including a minimum torque phase at which the load torque is at or near a minimum value. The connection is switched while the current flowing through the motor is zero. It is possible to switch the connection of the windings while the motor is rotating, and avoid an increase in apparatus size.

12 Claims, 17 Drawing Sheets

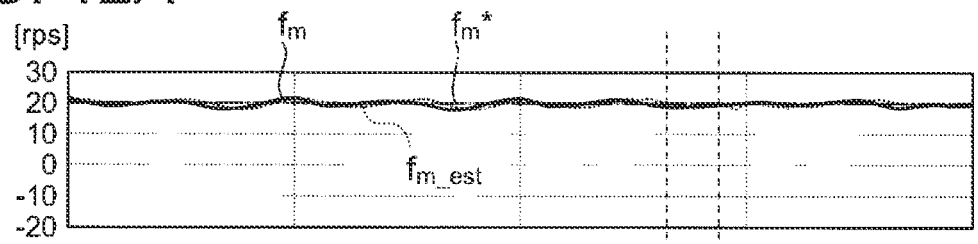
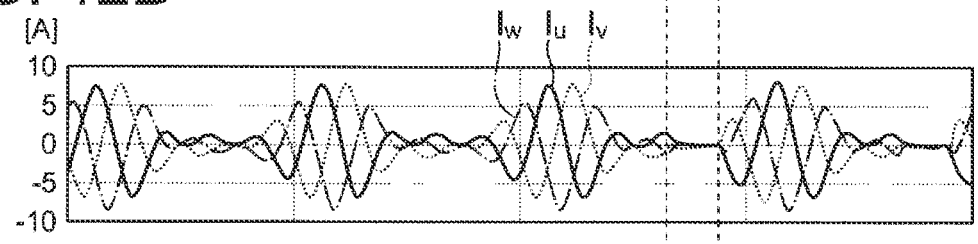
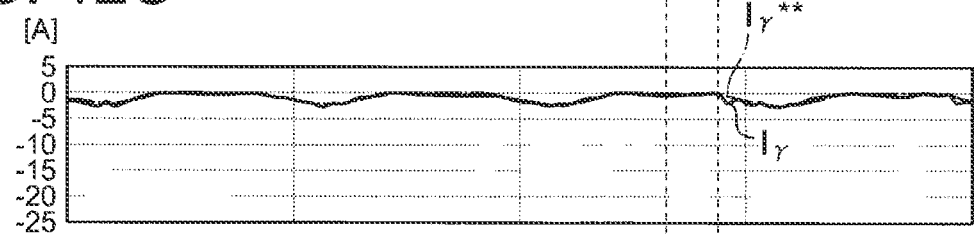
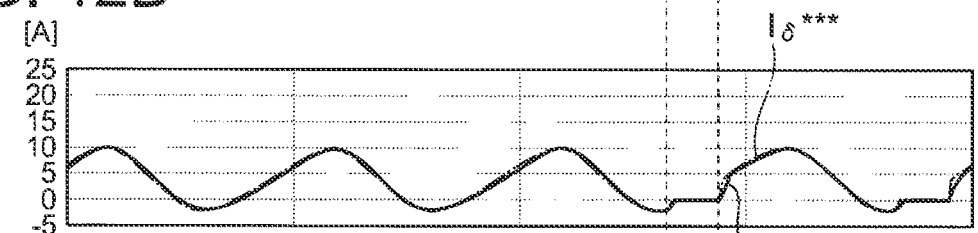
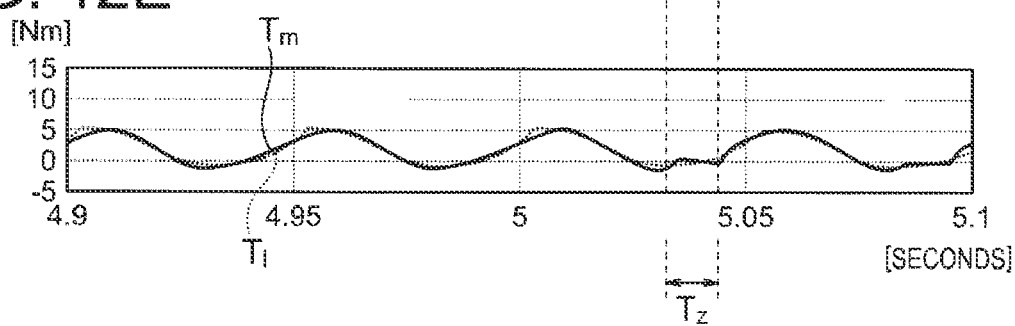

MOTOR DRIVING APPARATUS AND REFRIGERATION CYCLE EQUIPMENT

CROSS REFERENCE TO RELATED APPLICATION

This application is a U.S. national stage application of International Application No. PCT/JP2019/006486 filed on Feb. 21, 2019, the contents of which are incorporated herein by reference.

TECHNICAL FIELD

The present invention relates to a motor driving apparatus and refrigeration cycle equipment provided therewith.

BACKGROUND

It is conventionally proposed to switch a motor driven by an inverter between star connection and delta connection while rotating the motor (see, e.g., Patent Literature 1).

PATENT LITERATURE

Patent Literature 1: Japanese Patent Application Publication No. 2016-86587 (paragraphs 0042 to 0056)

In the technique described in Patent Literature 1, the speed of the motor may greatly decrease at the time of the switching, which may cause failures, such as control failure (step-out) or wear of a shaft of the motor.

SUMMARY

The present invention has been made in view of the above, and is intended to provide a motor driving apparatus capable of switching the connection of windings while rotating a motor and preventing the speed of the motor from greatly decreasing at the time of the switching.

A motor driving apparatus according to the present invention includes: a motor to drive a load element having a load torque that varies periodically, the motor having a connection; a connection switching device to switch the connection of the motor; an inverter to apply an alternating-current voltage of variable frequency and variable voltage value to the motor; and a control device to control the inverter and the connection switching device, wherein the control device controls the inverter so that an output torque of the motor follows periodical variation of the load torque, and controls the inverter so that a current flowing through the motor is zero during a period including a minimum torque phase at which the load torque is at or near a minimum value, and causes the connection switching device to switch the connection during the period during which the inverter is controlled so that the current flowing through the motor is zero.

With the present invention, it is possible to switch the connection of windings while rotating a motor and prevent the speed of the motor from greatly decreasing at the time of the switching.

BRIEF DESCRIPTION OF DRAWINGS

FIGS. 12A to 12E are graphs illustrating an example of variations in rotational speed and the like while switching is performed with zero current control.

DETAILED DESCRIPTION

The following describes motor driving apparatuses according to embodiments of the present invention, and refrigeration cycle equipment provided therewith, with reference to the attached drawings. The present invention is not limited by the following embodiments.

An example of refrigeration cycle equipment is an air conditioner, and in the following embodiments, the present invention is applied to a driving apparatus for a motor that drives a compressor of an air conditioner.

First, a refrigeration cycle in an example of the air conditioner will be described with reference to FIG. 1.

Figure 1:
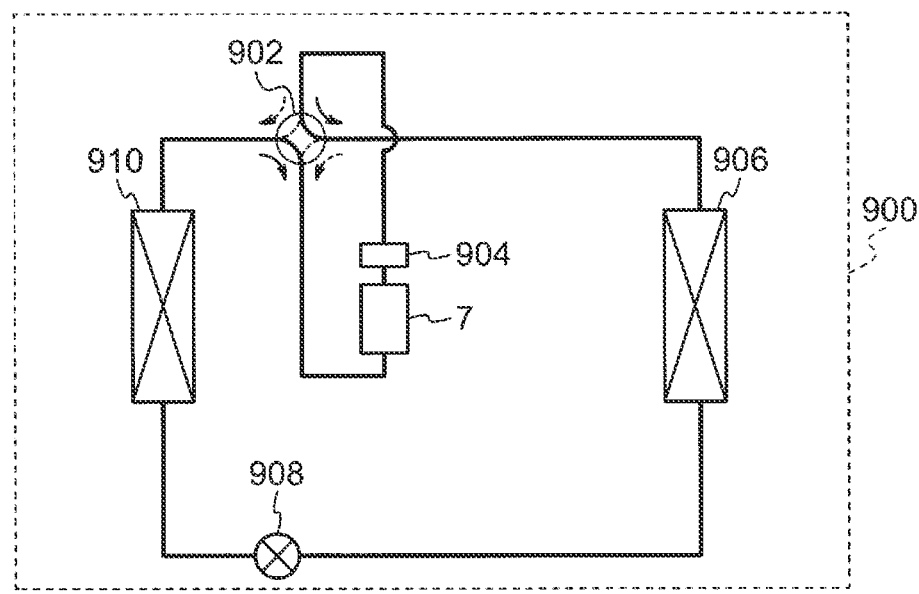
FIG. 1 is a schematic diagram illustrating an example of a refrigeration cycle of an air conditioner.

The refrigeration cycle 900 of FIG. 1 is capable of performing heating operation or cooling operation by switching operation of a four-way valve 902.

In the heating operation, as indicated by the solid arrows, a refrigerant is compressed and pumped out by a compressor 904, and returns to the compressor 904 through the four-way valve 902, an indoor heat exchanger 906, an expansion valve 908, an outdoor heat exchanger 910, and the four-way valve 902.

In the cooling operation, as indicated by the dashed arrows, the refrigerant is compressed and pumped out by the compressor 904, and returns to the compressor 904 through the four-way valve 902, outdoor heat exchanger 910, expansion valve 908, indoor heat exchanger 906, and four-way valve 902.

In the heating operation, the indoor heat exchanger 906 functions as a condenser and releases heat, and the outdoor heat exchanger 910 functions as an evaporator and absorbs heat. In the cooling operation, the outdoor heat exchanger 910 functions as a condenser and releases heat, and the indoor heat exchanger 906 functions as an evaporator and absorbs heat. The expansion valve 908 decompresses and expands the refrigerant.

The compressor 904 is driven by a motor 7 subjected to variable speed control.

First Embodiment

Figure 2:
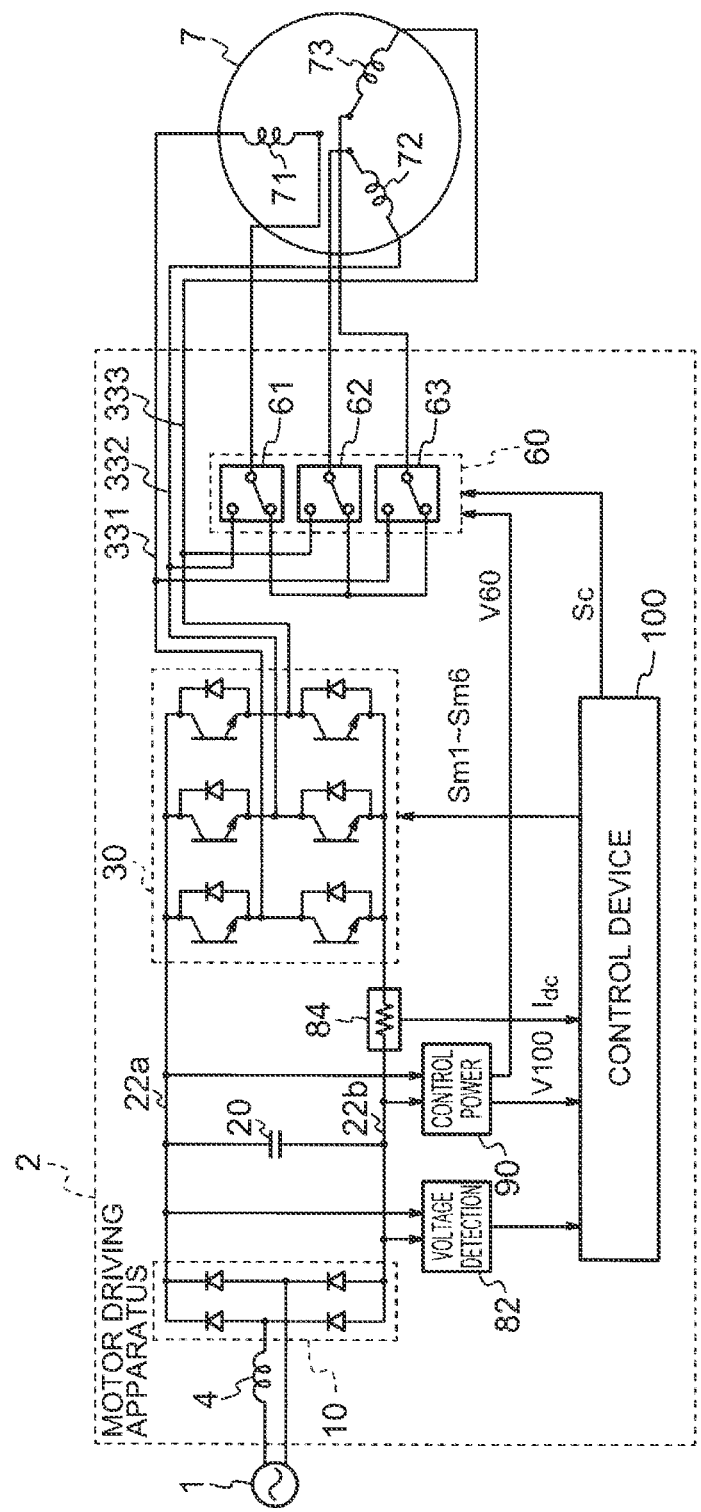
FIG. 2 is a diagram illustrating a motor driving apparatus of a first embodiment of the present invention.

FIG. 2 is a schematic wiring diagram illustrating a motor driving apparatus 2 of a first embodiment of the present invention, together with the motor 7.

The illustrated motor driving apparatus 2 is for driving the motor 7, and includes a reactor 4, a rectifying circuit 10, a smoothing capacitor 20, an inverter 30, a connection switching device 60, a bus voltage detector 82, a bus current detector 84, a control power generation circuit 90, and a control device 100.

The rectifying circuit 10 rectifies an alternating-current (AC) voltage supplied from an AC power supply 1. In the illustrated example, the rectifying circuit 10 is formed by a diode bridge. An input terminal of the diode bridge is connected to the AC power supply 1 through the reactor 4, and output terminals are connected to the smoothing capacitor 20.

The smoothing capacitor 20 smooths an output voltage of the rectifying circuit 10.

One electrode of the smoothing capacitor 20 is connected to a first output terminal of the rectifying circuit 10 and a direct-current (DC) bus 22a on a high potential side (positive side).

Another electrode of the smoothing capacitor 20 is connected to a second output terminal of the rectifying circuit 10 and a DC bus 22b on a low potential side (negative side).

The voltage smoothed by the smoothing capacitor 20 will be referred to as the "bus voltage".

The inverter 30 receives the voltage between both ends of the smoothing capacitor 20, i.e., the bus voltage, generates a three-phase AC voltage of variable frequency and variable voltage, and supplies it to the motor 7 through output lines 331 to 333.

The motor 7 is a three-phase permanent magnet synchronous motor, and has ends of stator windings drawn to the outside of the motor 7. The windings can be connected in star connection (Y-connection) and in delta connection (Δ-connection). The connection is selected by the connection switching device 60.

The bus voltage detector 82 detects a voltage $V_{dc}$ between the buses 22a and 22b as the bus voltage. For example, the bus voltage detector 82 includes a circuit that divides the bus voltage $V_{dc}$ with resistors connected in series, converts it into a voltage suitable for processing by a microcomputer in the control device 100, e.g., a voltage of 5 V or less, and outputs it. This signal (voltage detection signal) is converted into a digital signal by an A/D converter (not illustrated) in the control device 100, and used for processing in the control device 100.

The bus current detector 84 detects a bus current, i.e., an input current $I_{dc}$ to the inverter 30. The bus current detector 84 includes a shunt resistor inserted in the DC bus 22b, and supplies an analog signal indicating the detection result to the control device 100. This signal (current detection signal) is converted into a digital signal by an A/D converter (not illustrated) in the control device 100, and used for processing in the control device 100.

The control power generation circuit 90 receives and steps down the voltage between both electrodes of the capacitor 20, i.e., the bus voltage $V_{dc}$, to generate a control power supply voltage V100 and a switching power supply voltage V60, and supplies the control power supply voltage V100 to the control device 100 and also supplies the switching power supply voltage V60 to the connection switching device 60.

The control device 100 controls operation of the inverter 30 and switching of the connection by the connection switching device 60.

For controlling the inverter 30, the control device 100 generates PWM signals Sm1 to Sm6 and supplies them to the inverter 30.

For controlling the connection switching device 60, the control device 100 generates a connection selection signal Sc and supplies it to the connection switching device 60.

Figure 3:
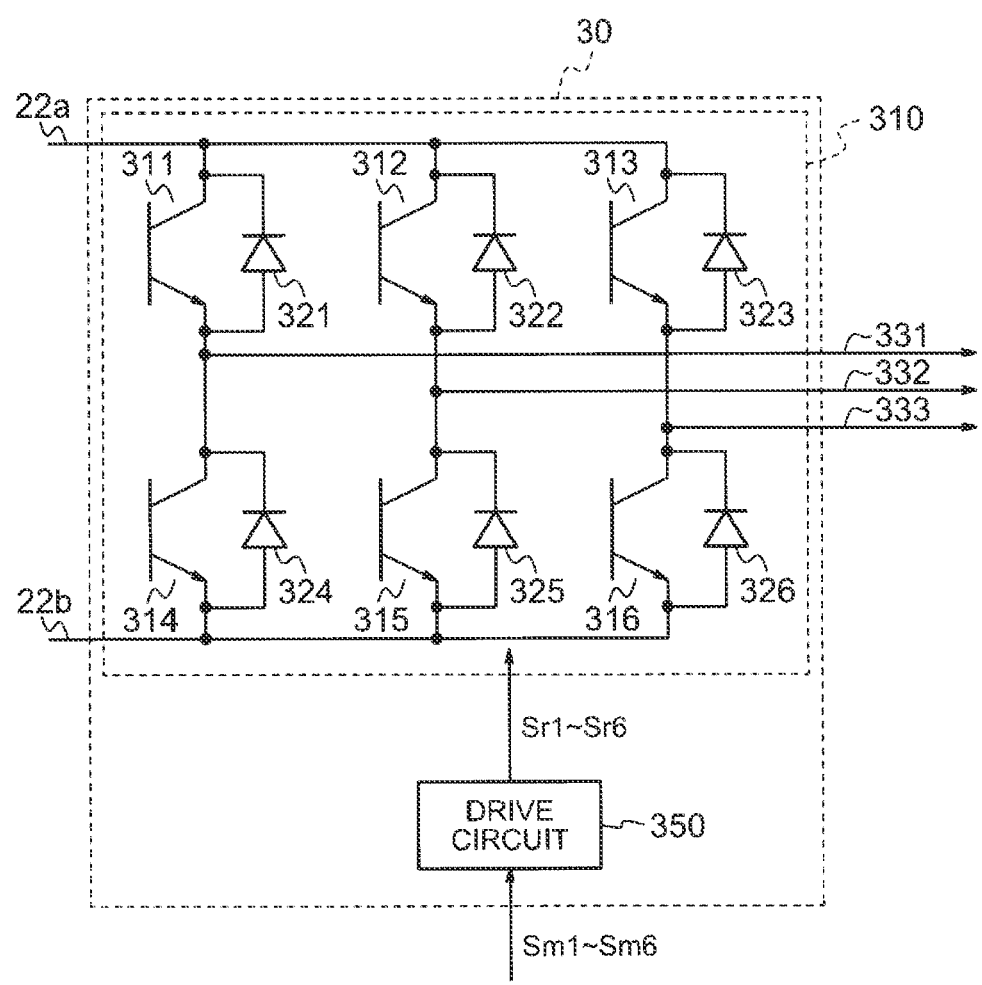
FIG. 3 is a diagram illustrating an example of a configuration of an inverter of FIG. 2.

The inverter 30 includes an inverter main circuit 310 and a drive circuit 350, and input terminals of the inverter main circuit 310 are connected to the DC buses 22a and 22b, as illustrated in FIG. 3.

The inverter main circuit 310 includes six arms including respective switching elements 311 to 316. Freewheeling rectifier elements 321 to 326 are connected in antiparallel with the switching elements 311 to 316.

The drive circuit 350 generates drive signals Sr1 to Sr6 on the basis of the PWM signals Sm1 to Sm6 and controls turning on and off of the switching elements 311 to 316 by using the drive signals Sr1 to Sr6, thereby applying the three-phase AC voltage of variable frequency and variable voltage to the motor 7 through the output lines 331 to 333.

While the PWM signals Sm1 to Sm6 have a magnitude (0 to 5 V) of a signal level of a logic circuit, the drive signals Sr1 to Sr6 are signals having a voltage level required to control the switching elements 311 to 316, e.g., a magnitude of +15 V to −15 V. Also, while the PWM signals Sm1 to Sm6 take a ground potential of the control device 100 as their reference potentials, the drive signals Sr1 to Sr6 take potentials of negative terminals (emitter terminals) of the respective corresponding switching elements as their reference potentials.

Figure 4:
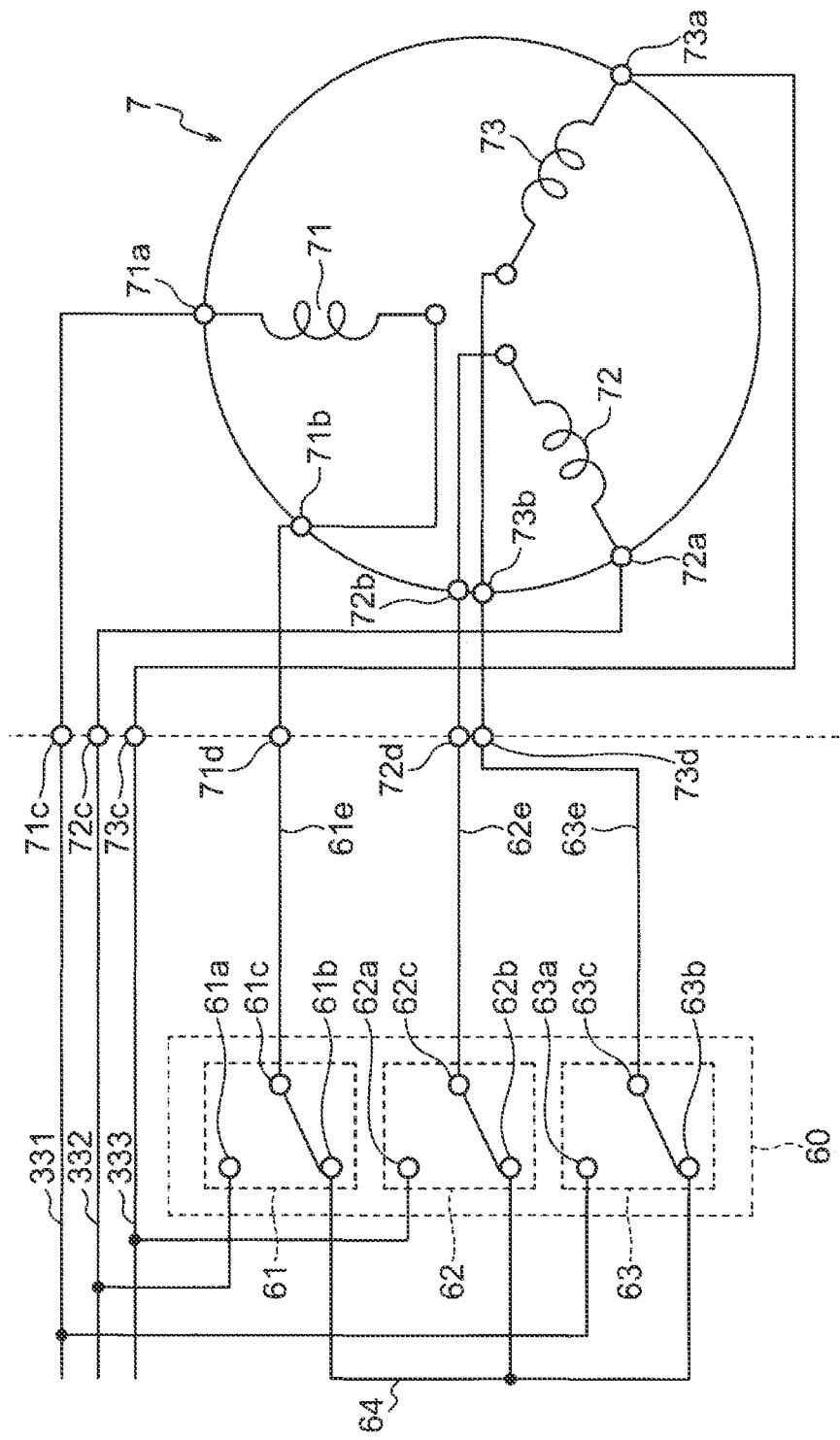
FIG. 4 is a wiring diagram illustrating in detail windings of a motor and a connection switching device illustrated in FIG. 2.

FIG. 4 illustrates in more detail the stator windings of the motor 7 and the connection switching device 60.

As illustrated, first ends 71a, 72a, and 73a of windings 71, 72, and 73 of three phases of U-, V-, and W-phases of the motor 7 are respectively connected to external terminals 71c, 72c, and 73c, and second ends 71b, 72b, and 73b of the windings 71, 72, and 73 of the U-, V-, and W-phases are respectively connected to external terminals 71d, 72d, and 73d, which allows the motor 7 to be connected to the outside. The output lines 331, 332, and 333 of the U-, V-, and W-phases of the inverter 30 are connected to the external terminals 71c, 72c, and 73c.

Figure 5:
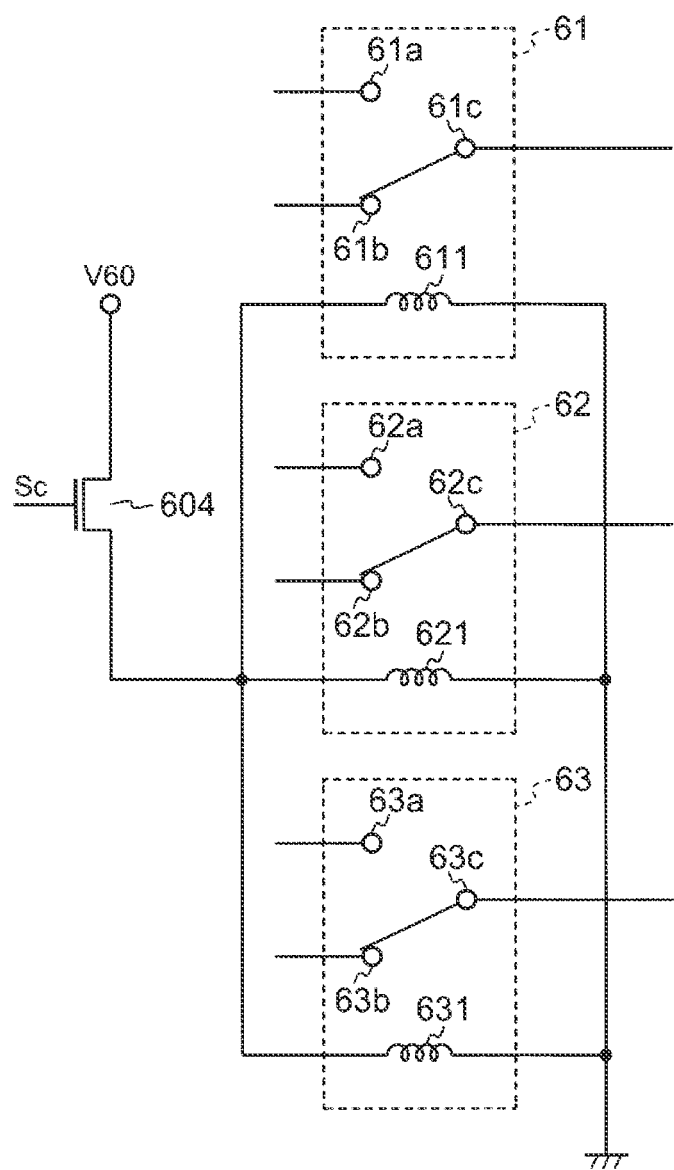
FIG. 5 is a wiring diagram illustrating in detail switches of the connection switching device illustrated in FIG. 4.

In the illustrated example, the connection switching device 60 is constituted by switches 61, 62, and 63. As the switches 61, 62, and 63, electromagnetic contactors in which contacts are electromagnetically opened and closed are used. Such electromagnetic contactors include those referred to as relays, contactors, and the like, are configured, for example, as illustrated in FIG. 5, and have different connection states depending on whether current is flowing through exciting coils 611, 621, and 631.

The exciting coils 611, 621, and 631 are connected to receive the switching power supply voltage V60 through a semiconductor switch 604. Opening and closing of the semiconductor switch 604 are controlled by the connection selection signal Sc output from the control device 100. For example, when the connection selection signal Sc is at a first value, e.g., Low, the semiconductor switch 604 is off, and when the connection selection signal Sc is at a second value, e.g., High, the semiconductor switch 604 is on.

When the connection selection signal Sc is output from a circuit having sufficient current capacity, it is also possible to directly apply the current of the connection selection signal Sc to the exciting coils 611, 621, and 631. In this case, the semiconductor switch 604 is not required.

A common contact 61c of the switch 61 is connected to the terminal 71d through a lead 61e, a normally closed contact 61b is connected to a neutral node 64, and a normally open contact 61a is connected to the V-phase output line 332 of the inverter 30.

A common contact 62c of the switch 62 is connected to the terminal 72d through a lead 62e, a normally closed contact 62b is connected to the neutral node 64, and a normally open contact 62a is connected to the W-phase output line 333 of the inverter 30.

A common contact 63c of the switch 63 is connected to the terminal 73d through a lead 63e, a normally closed contact 63b is connected to the neutral node 64, and a normally open contact 63a is connected to the U-phase output line 331 of the inverter 30.

When no current is flowing through the exciting coils 611, 621, and 631, the switches 61, 62, and 63 are in a state in which they are switched to the normally closed contact sides, i.e., the common contacts 61c, 62c, and 63c are connected to the normally closed contacts 61b, 62b, and 63b, as illustrated. In this state, the ends 71b, 72b, and 73b of the windings 71, 72, and 73 are connected with each other at the neutral node 64 through the switches 61, 62, and 63, and thus the motor 7 is in the Y-connection state.

When current is flowing through the exciting coils 611, 621, and 631, the switches 61, 62, and 63 are in a state in which they are switched to the normally open contact sides, i.e., the common contacts 61c, 62c, and 63c are connected to the normally open contacts 61a, 62a, and 63a, contrary to the illustration. In this state, the ends 71b, 72b, and 73b of the windings 71, 72, and 73 are respectively connected to the ends 72a, 73a, and 71a of the windings 72, 73, and 71 through the switches 61, 62, and 63, and thus the motor 7 is in the δ-connection state.

Thus, when the connection selection signal Sc is at Low, the motor 7 is in the Y-connection state, and when the connection selection signal Sc is at High, the motor 7 is in the Δ-connection state.

Figure 6A:
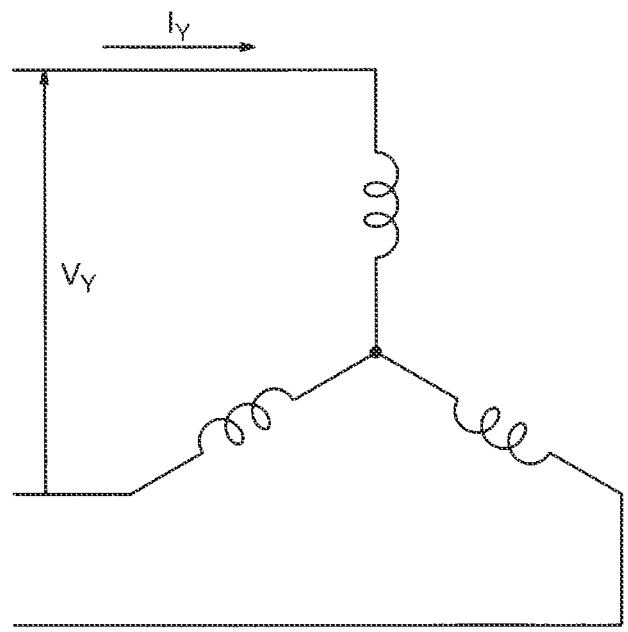
FIGS. 6A and 6B are diagrams conceptually illustrating the windings in different connection states of the motor.
Figure 6B:
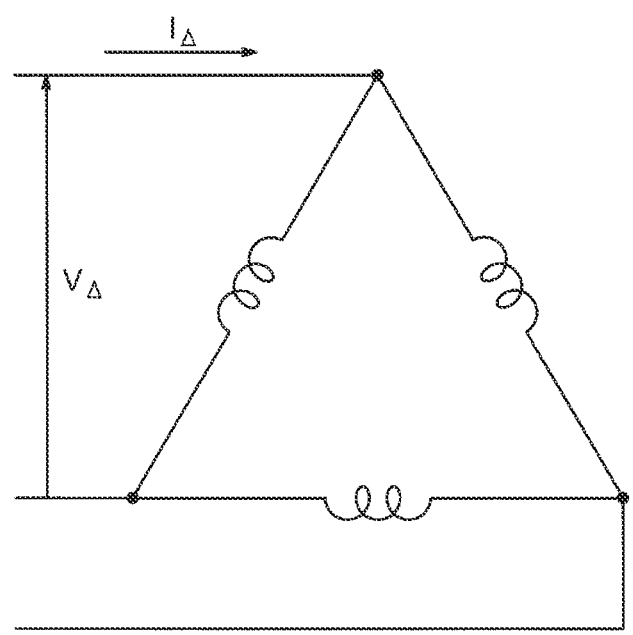

The following describes, with reference to FIGS. 6A and 6B, an advantage of using, as the motor 7, one switchable between Y-connection and Δ-connection.

FIG. 6A conceptually illustrates the connection state of the stator windings in Y-connection, and FIG. 6B conceptually illustrates the connection state of the stator windings in Δ-connection.

When it is assumed that the effective value of the line voltage in Y-connection is $V_Y$, the effective value of the current in Y-connection is $I_Y$, the effective value of the line voltage in Δ-connection is $V_\Delta$, the effective value of the current in Δ-connection is $I_\Delta$, and the effective values of the voltages applied to the windings of the respective phases are equal to each other, the relationship $$V_\Delta = \frac{V_Y}{\sqrt{3}} \quad (1)$$

holds, and at this time, the relationship $$I_\Delta = \sqrt{3} \times I_Y \quad (2)$$

holds.

When the voltage $V_Y$ and current $I_Y$ in Y-connection and the voltage $V_\Delta$ and current $I_\Delta$ in Δ-connection have the relationships of equations (1) and (2), the powers supplied to the motor in Y-connection and in Δ-connection are equal to each other.

Thus, when the powers supplied to the motor are equal to each other, the current is greater and the voltage required for driving is lower in Δ-connection.

It is conceivable to select the connection depending on the load condition or the like by taking advantage of the above characteristic. For example, it is conceivable that when the load is low, low speed operation is performed in Y-connection, and when the load is high, high speed operation is performed in Δ-connection. This makes it possible to improve the efficiency at the time of low load and increase the output power at the time of high load.

This will be described below in more detail by taking a case of a motor for driving a compressor of an air conditioner.

As the motor 7 for driving a compressor of an air conditioner, a synchronous motor using a permanent magnet in a rotor is widely used to meet the demand for energy saving. Also, a recent air conditioner is configured to, when a room temperature is greatly different from a set temperature, rotate the motor 7 at high speed to rapidly bring it close to the set temperature, and when the room temperature is close to the set temperature, rotate the motor 7 at low speed to maintain the room temperature. In this case, the proportion of the time of the low speed operation is great.

In the case of using a synchronous motor, as the rotational frequency increases, a back electromotive force increases, and a voltage value required for driving increases. The back electromotive force is higher in Y-connection than in Δ-connection, as described above.

To reduce the back electromotive force at high speed, it is conceivable to decrease the magnetic force of the permanent magnet or decrease the number of turns of the stator windings. However, such measures increase the current for producing the same output torque, thus increasing the current flowing through the motor 7 and inverter 30 and decreasing the efficiency.

Thus, it is conceivable to switch the connection depending on the rotational frequency. For example, when the operation at high speed is required, Δ-connection is selected. Thereby, it is possible to reduce the voltage required for driving to $1/\sqrt{3}$ of that in Y-connection. Thus, there is no need to reduce the number of turns of the windings, and there is also no need to use flux weakening control.

On the other hand, in low speed rotation, by selecting Y-connection, it is possible to reduce the current value to $1/\sqrt{3}$ of that in Δ-connection. Further, it becomes possible to design the windings to be suitable for driving at low speed in Y-connection, and it becomes possible to reduce the current value compared to the case of using Y-connection over the entire speed range. As a result, it is possible to reduce the loss of the inverter 30 and improve the efficiency.

As described above, it is meaningful to switch the connection state depending on the load condition, and the connection switching device is provided to enable such switching.

The control device 100 controls operation of the inverter 30 and switching of the connection by the connection switching device 60, as described above.

Specifically, the control device 100 controls the inverter 30 to change the frequency and voltage value of its output voltage.

The angular frequency ω of the output voltage of the inverter 30 determines the rotational angular speed (denoted by the same symbol ω as the angular frequency of the output voltage) in electrical angle of the motor 7, and the rotational angular speed $\omega_m$ in mechanical angle of the motor 7 is equal to a value obtained by dividing the rotational angular speed w in electrical angle of the motor 7 by the number $P_m$ of pole pairs. Thus, the rotational angular speed $\omega_m$ in mechanical angle of the motor 7 and the angular frequency ω of the output voltage of the inverter 30 have a relationship represented by the following equation (3):

$$\omega_m = \frac{\omega}{P_m}. \tag{3}$$

In this document, a rotational angular speed may be referred to simply as a rotational speed, and an angular frequency may be referred to simply as a frequency.

The control device 100 generates an excitation current command value $I_\gamma^*$ on the basis of currents $I_u$, $I_v$, and $I_w$ flowing through the motor 7, generates a γ-axis voltage command value $V_\gamma^*$ on the basis of the excitation current command value $I_\gamma^*$, calculates a torque current command value $I_\delta^*$ to make an estimated speed west of the motor 7 equal to a speed command value ω*, generates a δ-axis voltage command value $V_\delta^*$ on the basis of the calculated torque current command value $I_\delta^*$, and controls the inverter 30 on the basis of the γ-axis voltage command value $V_\gamma^*$ and δ-axis voltage command value $V_\delta^*$.

When the motor 7 drives a load element having a periodically varying load torque, it is preferable that the control device 100 control the inverter 30 so that an output torque $T_m$ of the motor 7 follows the periodical variation (ripple) of the load torque $T_l$.

The control device 100 may generate a torque current compensation value for the above-described follow. The generated torque current compensation value is used to correct the above torque current command value $I_\delta^*$.

The control device 100 also controls the connection switching device 60 to select the connection of the motor 7. For switching of the connection, the control device 100 performs zero current control. Zero current control refers to controlling the inverter 30 so that the current flowing through the motor 7 is zero.

Specifically, the control device 100 detects a phase (minimum torque phase) at which the load torque $T_l$ is at a minimum (minimum value), and performs the zero current control during a period including the minimum torque phase. Then, the control device 100 causes the connection switching device 60 to switch the connection during the period during which the zero current control is performed.

When the control device 100 performs control to cause the output torque $T_m$ of the motor to follow the ripple of the load torque $T_l$, the output torque $T_m$ can be considered to be equal to the load torque $T_l$.

Thus, the control device 100 may calculate the output torque $T_m$ of the motor 7, use the calculated output torque $T_m$ as an estimated value of the load torque, and detect the minimum torque phase on the basis of the estimated value.

When a component (nth ripple component) at a frequency that is n times the rotational frequency of the motor 7 is the largest of the ripple components of the load torque $T_l$, the torque current compensation value may be for mainly compensating the nth ripple component.

In this case, the control device 100 may detect a phase at which the nth ripple component of the load torque $T_l$ is at a minimum.

Thus, the control device 100 may calculate the output torque $T_m$ of the motor 7, extract, from the calculated output torque $T_m$, a component at a frequency that is n times the rotational frequency of the motor 7, and detect a phase at which the extracted component is at a minimum, as the phase at which the nth ripple component of the load torque $T_l$ is at a minimum.

The control device 100 is implemented by a microprocessor. The microprocessor may be a processor or processing device referred to as a central processing unit (CPU), a microcomputer, or a digital signal processor (DSP).

Figure 7:
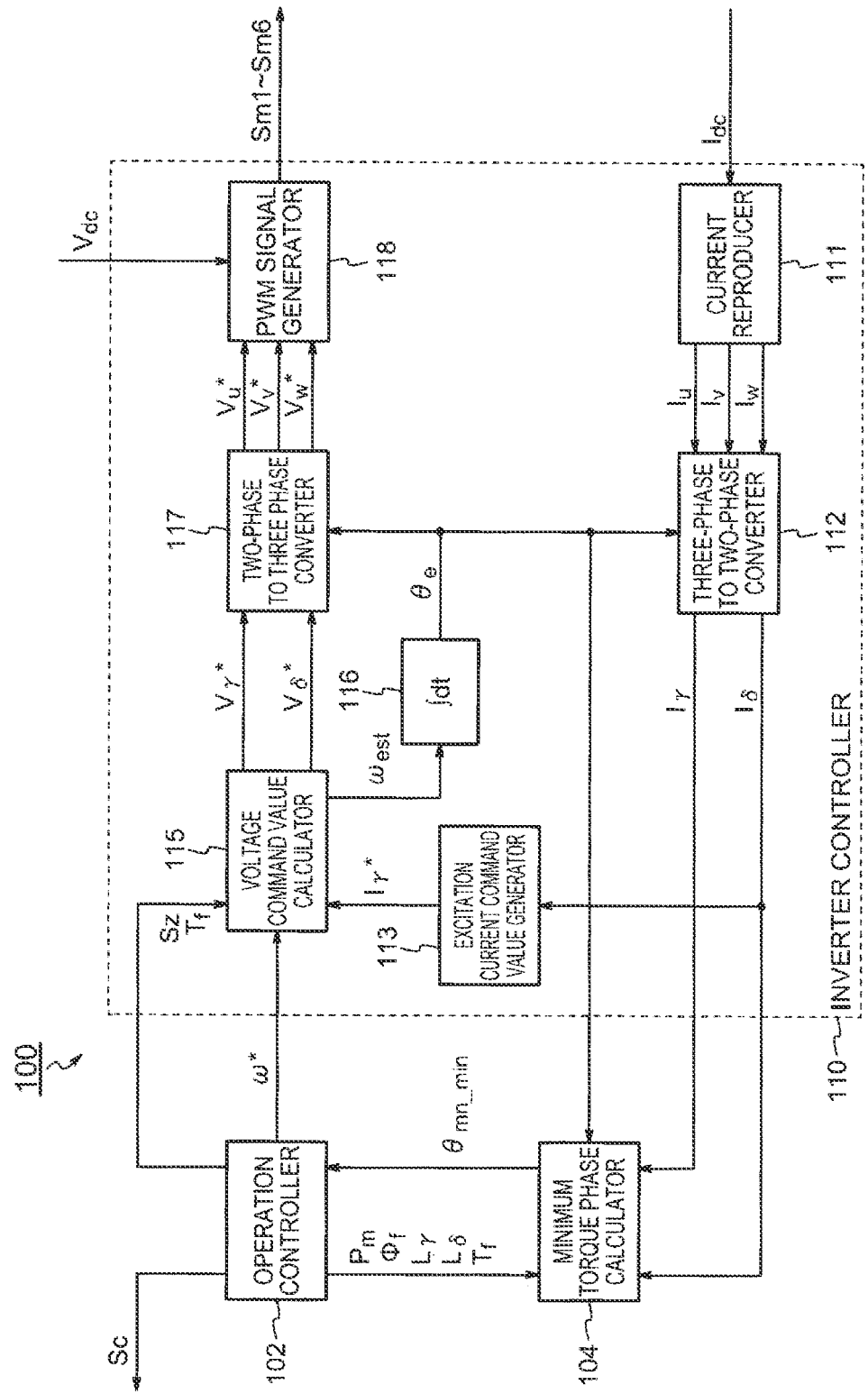
FIG. 7 is a functional block diagram illustrating an example of a control device used in the first embodiment.

FIG. 7 is a functional block diagram illustrating an example of the control device 100. As illustrated, the control device 100 includes an operation controller 102, a minimum torque phase calculator 104, and an inverter controller 110.

The operation controller 102 outputs a frequency command value ω*, a zero selection signal Sz, and the connection selection signal Sc. The operation controller 102 also outputs the number $P_m$ of pole pairs, an interlinkage magnetic flux $\phi_f$ of the permanent magnet of the motor 7, a γ-axis inductance $L_\gamma$, a δ-axis inductance $L_\delta$, and a time constant $T_f$ of a low-pass filter to be described later (specifically, information indicating them).

The frequency command value ω* is determined by multiplying a command value (rotational angular speed command value) $\omega_m^*$ of the rotational speed of the motor 7 by the number $P_m$ of pole pairs, as represented by the following equation (4):

$$\omega^* = \omega_m^* \times P_m. \tag{4}$$

The frequency command value ω* and zero selection signal Sz are supplied to the inverter controller 110.

The connection selection signal Sc is supplied to the connection switching device 60.

The pole pair number $P_m$, interlinkage magnetic flux $\phi_f$, γ-axis inductance $L_\gamma$, and δ-axis inductance $L_\delta$ are supplied to the minimum torque phase calculator 104.

The time constant $T_f$ is supplied to the minimum torque phase calculator 104 and inverter controller 110.

The connection selection signal Sc is set to the first value, e.g., Low, when Y-connection is selected, and set to the second value, e.g., High, when Δ-connection is selected.

The zero selection signal Sz is normally set to a first value, e.g., Low, and set to a second value, e.g., High, during the zero current control.

The operation controller 102 receives information indicating a room temperature (the temperature of a space to be air conditioned) detected by a temperature sensor (not illustrated), receives instructions from an operation unit (not illustrated), e.g., a remote controller, and controls operation of units of the air conditioner. The instructions from the operation unit include information indicating a set temperature, a selection of the operation mode (heating, cooling, dehumidification, or the like), a command to start the operation, and a command to end the operation.

The operation controller 102 makes, for example, a determination as to whether the stator windings of the motor 7 are to be connected in Y-connection or Δ-connection, and a determination of a target rotational speed, and outputs the connection selection signal Sc and frequency command value ω* on the basis of the determinations.

For example, when a difference between the room temperature and the set temperature is great, the operation controller 102 determines to connect the motor in Δ-connection, sets the connection selection signal Sc to High, sets the target rotational speed to a relatively high value, and outputs the frequency command value ω* such that it gradually increases to the frequency corresponding to the above target rotational speed after the starting.

When the frequency corresponding to the target rotational speed is reached, the state is maintained until the room temperature approaches the set temperature. When the room temperature approaches the set temperature, the motor is switched to Y-connection by setting the connection selection signal Sc to Low. After that, control to maintain the state in which the room temperature is close to the set temperature is performed. This control includes adjustment of the frequency, stop of the motor, and restart of the motor.

When switching from one of Y-connection and Δ-connection to the other while rotating the motor 7, the operation controller 102 sets the zero selection signal Sz to High, and changes the value of the connection selection signal Sc during the period during which the zero selection signal Sz is at High.

Specifically, although the zero selection signal Sz is normally set at Low, when it is determined to perform the switching, the operation controller 102 sets the zero selection signal Sz to High during a period Tz including the minimum torque phase, and changes the value of the connection selection signal Sc to cause the connection switching device 60 to switch the connection during the period during which the zero selection signal Sz is at High.

Information indicating the minimum torque phase is provided from the minimum torque phase calculator 104.

The minimum torque phase calculator 104 determines a phase at which the load torque $T_l$ is at a minimum.

As described above, when the output torque $T_m$, is controlled to follow the ripple of the load torque $T_l$, the output torque $T_m$ can be considered to be equal to the load torque $T_l$.

Thus, in an example described below, the minimum torque phase calculator 104 calculates the output torque $T_m$ from the current flowing through the motor 7, uses the calculated value (calculated output torque) as an estimated value of the load torque, and detects a phase at which the estimated value (estimated load torque) of the load torque is at a minimum.

Also, it is assumed that the nth ripple component is the largest of the ripple components of the load torque $T_l$, and in the example described below, a phase $\theta_{mn\_min}$ at which the nth ripple component is at a minimum is detected.

The phase $\theta_{mn\_min}$ at which the nth ripple component is at a minimum is a phase angle position at which the nth ripple component is at a minimum in each cycle of the variation of the nth ripple component.

On the other hand, the phase at which the load torque is at a minimum is a phase angle position at which the load torque $T_l$ is at a minimum in each cycle of a fundamental wave of the variation of the load torque $T_l$.

For example, when the load element of the motor 7 is a single rotary compressor, the frequency of the largest ripple component is equal to the rotational frequency of the motor 7, and thus n=1.

When the load element of the motor 7 is a twin rotary compressor, the frequency of the largest ripple component is twice the rotational frequency of the motor 7, and thus n=Here, it is assumed that there is no transmission mechanism between the motor 7 and the compressor. When there is a transmission mechanism therebetween, the transmission ratio needs to be taken into account.

In calculation of the minimum torque phase $\theta_{mn\_min}$, the pole pair number $P_m$, interlinkage magnetic flux $\Phi_f$, γ-axis inductance $L_\gamma$, and δ-axis inductance Ls are used in addition to an excitation current $I_\gamma$ and a torque current $I_\delta$ that are output from the inverter controller 110.

Here, it is assumed that the pole pair number $P_m$, interlinkage magnetic flux $\Phi_f$, γ-axis inductance $L_\gamma$, and δ-axis inductance $L_\delta$ are provided from the operation controller 102.

As the interlinkage magnetic flux $\Phi_f$, γ-axis inductance $L_\gamma$, and δ-axis inductance $L_\delta$, values that are predetermined and stored may be used.

The minimum torque phase calculator 104 calculates the output torque $T_m$, extracts, from the calculated output torque $T_m$, a nth ripple component $T_{mn}$ thereof, and determines a phase at which the nth ripple component $T_{mn}$ is at a minimum.

Figure 8:
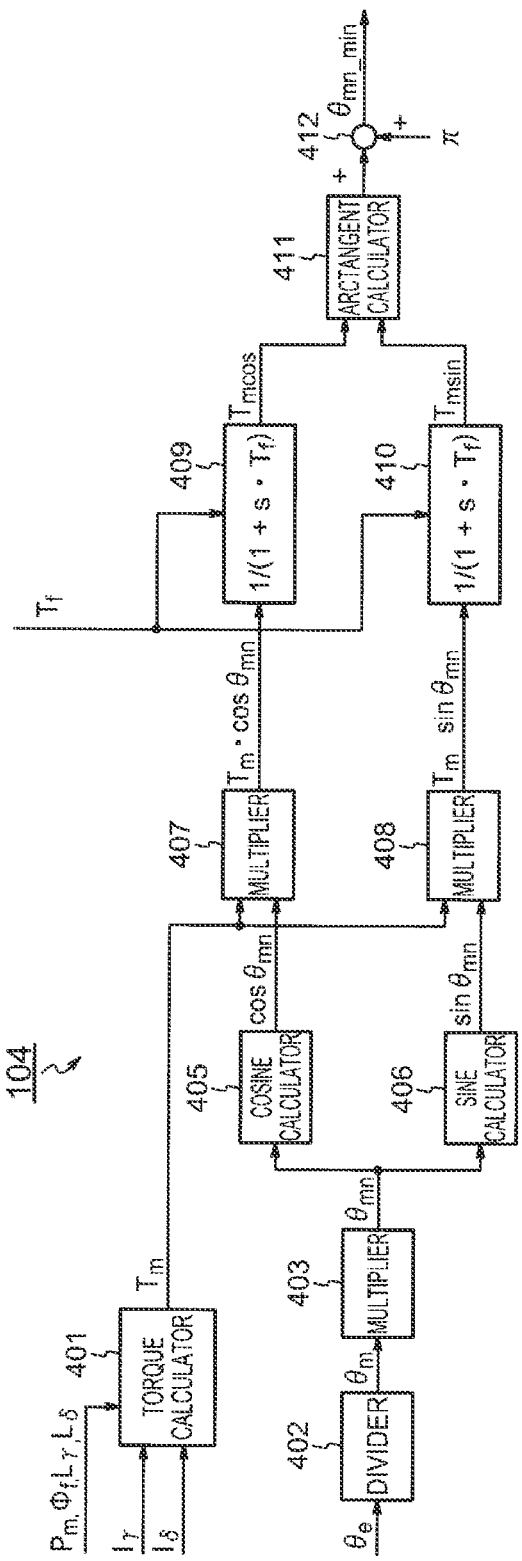
FIG. 8 is a functional block diagram illustrating an example of a configuration of a minimum torque phase calculator of FIG. 7.

FIG. 8 is an example of a configuration of the minimum torque phase calculator 104 of FIG. 7.

The illustrated minimum torque phase calculator 104 includes a torque calculator 401, a divider 402, a multiplier 403, a cosine calculator 405, a sine calculator 406, multipliers 407 and 408, low-pass filters 409 and 410, an arctangent calculator 411, and an adder 412.

The torque calculator 401 receives the excitation current $I_\gamma$ and torque current $I_\delta$ from the inverter controller 110, receives the pole pair number $P_m$, interlinkage magnetic flux $\Phi_f$, γ-axis inductance $L_\gamma$, and δ-axis inductance $L_\delta$ from the operation controller 102, and determines the output torque $T_m$ from them. The output torque $T_m$ can be calculated by the following equation (5):

$$T_m = P_m \varphi_f I_\delta + P_m (L_\gamma - L_\delta) I_\gamma I_\delta. \quad (5)$$

The output torque $T_m$ calculated by equation (5) includes a DC component and an AC component. The AC component is a component that periodically varies with time.

The divider 402 divides an electrical angle $\theta_e$ by the pole pair number $P_m$, thereby calculating a rotational phase (mechanical angle) $\theta_m$.

The multiplier 403 multiplies the rotational phase $\theta_m$ by n, thereby determining a phase (phase angle) $\theta_{mn}$ that varies at a frequency that is n times the rotational frequency of the motor 7.

The cosine calculator 405 receives the phase $\theta_{mn}$ and outputs cos $\theta_{mn}$.

The sine calculator 406 receives the phase $\theta_{mn}$ and outputs sin $\theta_{mn}$.

The multiplier 407 multiplies the output torque $T_m$ by cos $\theta_{mn}$ to determine a cosine component $T_m \cdot \cos \theta_{mn}$ of the output torque $T_m$. The multiplier 408 multiplies the output torque $T_m$ by sin $\theta_{mn}$ to determine a sine component $T_m \cdot \sin \theta_{mn}$ of the output torque $T_m$.

The cosine component $T_m \cdot \cos \theta_{mn}$ and sine component $T_m \cdot \sin \theta_{mn}$ include, besides ripple components at a frequency of $\omega_{mn}$, ripple components (harmonic components) at frequencies higher than $\omega_{mn}$.

Here, the frequency $\omega_{mn}$ is n times the frequency $\omega_m$, and $\omega_{mn}$ and $\theta_{mn}$ have the relationship of the following equation (6):

$$\theta_{mn} = \omega_{mn} \cdot t. \quad (6)$$

The low-pass filters 409 and 410 are first-order lag filters whose transfer functions are represented by $1/(1+sT_f)$.

Here, s is the Laplace operator. $T_f$ is the time constant, and is determined to remove (sufficiently attenuate) ripple components at frequencies higher than the frequency $\omega_{mn}$.

The time constant $T_f$ is determined, by using the estimated value $\omega_{est}$ of the frequency $\omega$, in the operation controller 102, to remove ripple components at frequencies higher than an estimated value $\omega_{mn\_est}$ calculated by the following equation (7):

$$\omega_{mn\_est} = \frac{n \cdot \omega_{est}}{P_m}. \quad (7)$$

The estimated value $\omega_{est}$ is calculated in the inverter controller 110, as described later.

As above, although instead of the frequency c, the estimated value $\omega_{mn\_est}$ thereof is used in the determination of the time constant $T_f$, $\omega_{mn\_est}$ is here considered to be equal to $\omega_{mn}$.

The time constant $T_f$ thus determined is provided to the low-pass filters 409 and 410 from the operation controller 102.

The low-pass filter 409 performs low-pass filtering on the cosine component $T_m \cdot \cos \theta_{mn}$ to remove ripple components at frequencies higher than the frequency $\omega_{mn}$, and outputs a low-frequency component $T_{mcos}$.

The low-frequency component $T_{mcos}$ is a DC quantity representing a cosine component at a frequency of $\omega_{mn}$ of the ripple components of the torque $T_m$.

The low-pass filter 410 performs low-pass filtering on the sine component $T_m \cdot \sin \theta_{mn}$ to remove ripple components at frequencies higher than the frequency $\omega_{mn}$, and outputs a low-frequency component $T_{msin}$.

The low-frequency component $T_{msin}$ is a DC quantity representing a sine component at a frequency of $\omega_{mn}$ of the ripple components of the torque $T_m$.

The arctangent calculator 411 receives $T_{mcos}$ and $T_{msin}$, and calculates an arctangent represented by the following equation (8):

$$\tan^{-1}\left(\frac{T_{msin}}{T_{mocs}}\right). \quad (8)$$

The adder 412 adds the arctangent represented by equation (8) and $\pi$, thereby determining the phase $\theta_{mn\_min}$, as shown by the following equation (9):

$$\theta_{mn\_min} = \pi + \tan^{-1}\left(\frac{T_{msin}}{T_{mocs}}\right). \quad (9)$$

The determined phase $\theta_{mn\_min}$ is a phase at which the nth ripple component of the output torque $T_m$ is at a minimum. As described above, when the ripple compensation is being successfully performed, the phase $\theta_{mn\_min}$ can be considered to be a phase at which the nth ripple component of the load torque $T_l$ is at a minimum.

The minimum torque phase $\theta_{mn\_min}$ thus determined is provided to the operation controller 102, and the operation controller 102 sets the zero selection signal Sz at High during a period Tz including the minimum torque phase $\theta_{mn\_min}$. Thus, the zero current control is performed during the period Tz.

The operation controller 102 also changes the value of the connection selection signal Sc, thereby causing the connection switching device 60 to switch the connection, during the above period Tz.

The period Tz during which the zero current control is performed is determined to occupy a part or the whole of a period Ty during which the load torque $T_l$ stays at or near a minimum value. By limiting the period Tz during which the zero current control is performed within the above period Ty, it is possible to reduce decrease in the rotational speed of the motor 7 during the period during which the zero current control is performed.

The inverter controller 110 generates the PWM signals Sm1 to Sm6 on the basis of the bus voltage $V_{dc}$ detected by the bus voltage detector 82, the bus current $I_{dc}$ detected by the bus current detector 84, and the frequency command value $\omega^*$ and time constant $T_f$ supplied from the operation controller 102, supplies them to the inverter 30, and causes the inverter 30 to output an AC voltage of variable frequency and variable voltage value.

The inverter controller 110 also performs the zero current control in accordance with the zero selection signal Sz supplied from the operation controller 102.

The inverter controller 110 includes a current reproducer 111, a three-phase to two-phase converter 112, an excitation current command value generator 113, a voltage command value calculator 115, an electrical phase calculator 116, a two-phase to three-phase converter 117, and a PWM signal generator 118.

The current reproducer 111 reproduces the phase currents $I_u$, $I_v$, and $I_w$ flowing through the motor 7 on the basis of the current value $I_{dc}$ detected by the bus current detector 84. The current reproducer 111 reproduces the phase currents by sampling the DC current $I_{dc}$ detected by the bus current detector 84 at times determined on the basis of the PWM signals Sm1 to Sm6 from the PWM signal generator 118.

The three-phase to two-phase converter 112 converts the current values $I_u$, $I_v$, and $I_w$ reproduced by the current reproducer 111 to the excitation current ($\gamma$-axis current) $I_\gamma$ and torque current ($\delta$-axis current) $I_\delta$, i.e., current values on $\gamma$-$\delta$ axes, by using the electrical phase $\theta_e$ generated by the electrical phase calculator 116 to be described later.

The excitation current command value generator 113 determines, on the basis of the torque current $I_\delta$, the excitation current command value $I_\gamma^*$ optimum for driving of the motor 7 at which the efficiency is highest.

In FIG. 7, the excitation current command value $I_\gamma^*$ is determined on the basis of the torque current $I_\delta$. However, the same effect can be obtained by determining the excitation current command value $I_\gamma^*$ on the basis of the excitation current $I_\gamma$ and frequency command value $\omega^*$.

The excitation current command value generator 113 outputs, on the basis of the torque current $I_\delta$ (or the excitation current $I_\gamma$ and frequency command value $\omega^*$), the excitation current command value $I_\gamma^*$ such that it provides a current phase $\beta_m$ (not illustrated) at which the output torque is not less than a predetermined value (or maximum), or the current value is not greater than a predetermined value (or minimum).

The voltage command value calculator 115 receives the excitation current $I_\gamma$ and torque current $I_\delta$ obtained by the three-phase to two-phase converter 112, the frequency command value ω* and zero selection signal Sz output from the operation controller 102, and the excitation current command value $I_\gamma^*$ obtained from the excitation current command value generator 113, and generates and outputs the voltage command values $V_\gamma^*$ and $V_\delta^*$ on the basis of them.

The voltage command value calculator 115 also estimates and outputs the estimated value $\omega_{est}$ of the frequency from the voltage command values $V_\gamma^*$ and $V_\delta^*$ and the excitation current $I_\gamma$ and torque current $I_\delta$.

The electrical phase calculator 116 calculates the electrical phase $\theta_e$ by integrating the frequency estimated value $\omega_{est}$ output from the voltage command value calculator 115.

The two-phase to three-phase converter 117 converts the γ-axis voltage command value $V_\gamma^*$ and δ-axis voltage command value $V_\delta^*$ (voltage command values in a two-phase coordinate system) obtained by the voltage command value calculator 115 to output voltage command values (three-phase voltage command values) $V_u^*$, $V_v^*$, and $V_w^*$ in a three-phase coordinate system, by using the electrical phase $\theta_e$ obtained by the electrical phase calculator 116, and outputs them.

The PWM signal generator 118 generates and outputs the PWM signals Sm1 to Sm6 on the basis of the bus voltage $V_{dc}$ detected by the bus voltage detector 82 and the three-phase voltage command values $V_u^*$, $V_v^*$, and $V_w^*$ obtained by the two-phase to three-phase converter 117.

Figure 9:
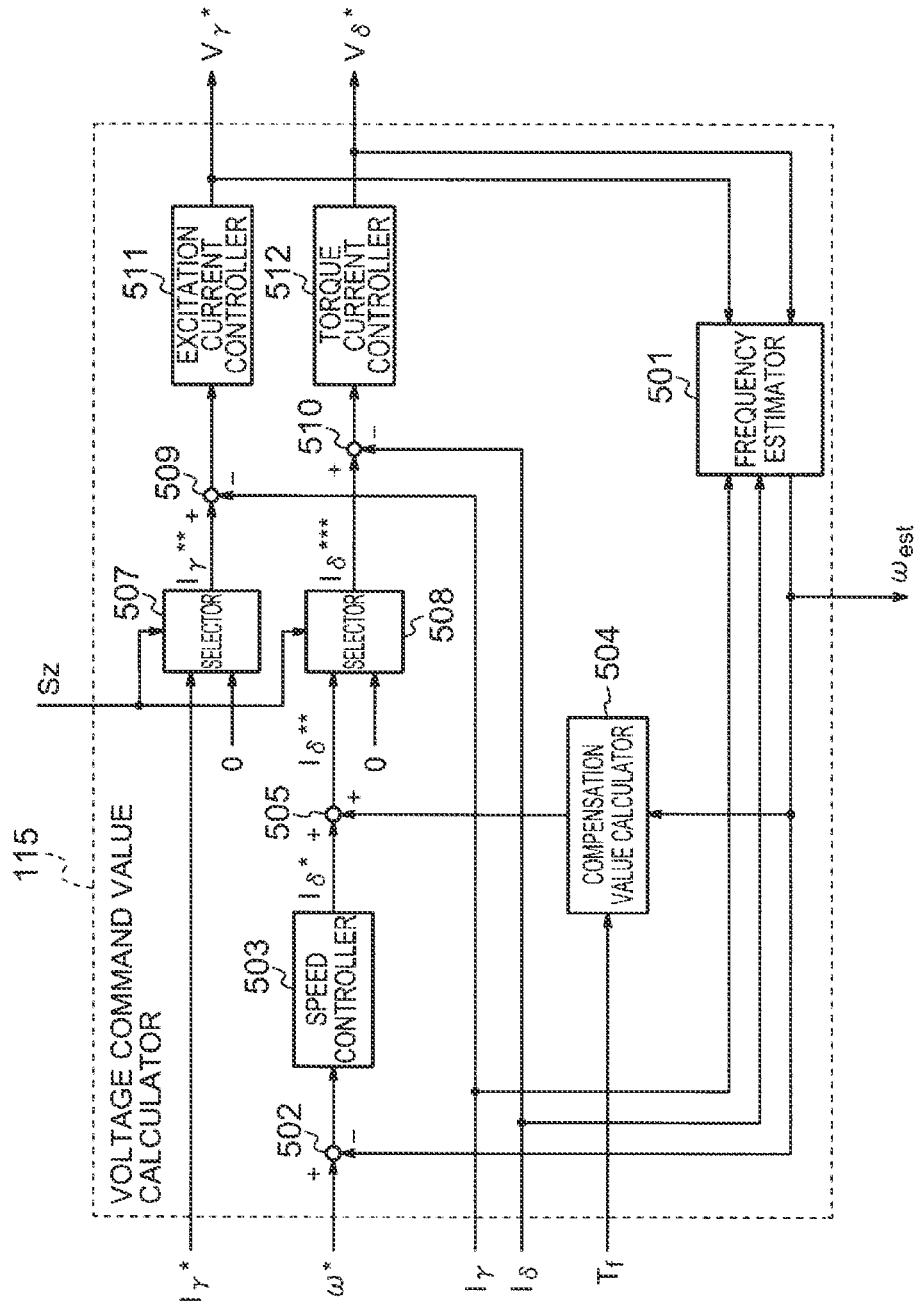
FIG. 9 is a functional block diagram illustrating an example of a configuration of a voltage command value calculator of FIG. 7.

The voltage command value calculator 115 includes a frequency estimator 501, a subtractor 502, a speed controller 503, a compensation value calculator 504, an adder 505, a selector 507, a selector 508, a subtractor 509, a subtractor 510, an excitation current controller 511, and a torque current controller 512, for example, as illustrated in FIG. 9.

The frequency estimator 501 receives the excitation current $I_\gamma$ and torque current $I_\delta$, and the voltage command values $V_\gamma^*$ and $V_\delta^*$, estimates the frequency of the voltage applied to the motor 7 on the basis of them, and outputs the estimated value $\omega_{est}$.

The subtractor 502 calculates a difference ($\omega^* - \omega_{est}$) of the frequency estimated value $\omega_{est}$ generated by the frequency estimator 501 relative to the frequency command value ω*.

The speed controller 503 performs proportional integral (PI) calculation on the difference ($\omega^* - \omega_{est}$) calculated by the subtractor 502 and determines the torque current command value $I_\delta^*$ to bring the difference closer to zero. By generating the torque current command value $I_\delta'$ in this manner, control to make the frequency estimated value $\omega_{est}$ coincide with the frequency command value ω* is performed.

The compensation value calculator 504 outputs a torque current compensation value $I_{\delta\_trq}$ on the basis of the frequency estimated value $\omega_{est}$ output from the frequency estimator 501.

The torque current compensation value $I_{\delta\_trq}$ is for reducing ripple components, in particular a ripple component at a frequency of $\omega_{mn}$, of the frequency $\omega_{est}$. Here, "ripple components, in particular a ripple component at a frequency of $\omega_{mn}$, of the frequency $\omega_{est}$" means ripple components, in particular a ripple component whose ripple frequency is $\omega_{mn}$, of a value (DC quantity) representing the frequency $\omega_{est}$.

The adder 505 adds the output $I_\delta^*$ of the speed controller 503 and the torque current compensation value $I_{\delta\_trq}$ to generate a corrected torque current command value $I_\delta^{**}$.

By correcting the torque current command value $I_\delta^*$ with the torque current compensation value $I_{\delta\_trq}$, it is possible to reduce the speed ripple caused by the ripple of the load torque.

The selector 507 selects and outputs one of the excitation current command value $I_\gamma^*$ and a value 0 in accordance with the zero selection signal Sz. For example, when the zero selection signal Sz is at Low, the selector 507 selects $I_\gamma^*$, and when the zero selection signal Sz is at High, the selector 507 selects 0. The output of the selector 507 will be referred to as a selected excitation current command value, and denoted by the symbol $I_\gamma^{**}$.

The subtractor 509 determines a difference ($I_\gamma^{} - I_\gamma$) of $I_\gamma$ relative to the excitation current command value $I_\gamma^{}$ selected by the selector 507.

The excitation current controller 511 performs proportional integral (PI) calculation on the difference ($I_\gamma^{**} - I_\gamma$) determined by the subtractor 509 to generate the γ-axis voltage command value $V_\gamma^*$ to bring the difference closer to zero. By generating the γ-axis voltage command value $V_\gamma^*$ in this manner, control to make $I_\gamma$ coincide with $I_\gamma^{**}$ is performed.

Specifically, when $I_\gamma^*$ is selected as $I_\gamma^{**}$, control to make $I_\gamma$ coincide with $I_\gamma^*$ is performed, and when 0 is selected as $I_\gamma^{**}$, control to make $I_\gamma$ coincide with 0 is performed.

The selector 508 selects and outputs one of the torque current command value $I_\delta^{}$ and a value 0 in accordance with the zero selection signal Sz. For example, when the zero selection signal Sz is at Low, the selector 508 selects $I_\delta^{}$, and when the zero selection signal Sz is at High, the selector 508 selects 0. The output of the selector 508 will be referred to as a selected torque current command value, and denoted by the symbol $I_\delta^{***}$.

The subtractor 510 determines a difference ($I_\delta^{*} - I_\delta$) of $I_\delta$ relative to the torque current command value $I_\delta^{*}$ selected by the selector 508.

The torque current controller 512 performs proportional integral (PI) calculation on the difference ($I_\delta^{***} - I_\delta$) determined by the subtractor 510 to generate the δ-axis voltage command value $V_\delta^*$ to bring the difference closer to zero. By generating the δ-axis voltage command value $V_\delta^*$ in this manner, control to make $I_\delta$ coincide with $I_\delta^{***}$ is performed.

Specifically, when $I_\delta^{}$ is selected as $I_\delta^{*}$, control to make $I_\delta$ coincide with $I_\delta^{}$ is performed, and when 0 is selected as $I_\delta^{*}$, control to make $I_\delta$ coincide with 0 is performed.

The "zero current control" is implemented by the control to make the excitation current $I_\gamma$ and torque current $I_\delta$ coincide with 0.

Figure 10:
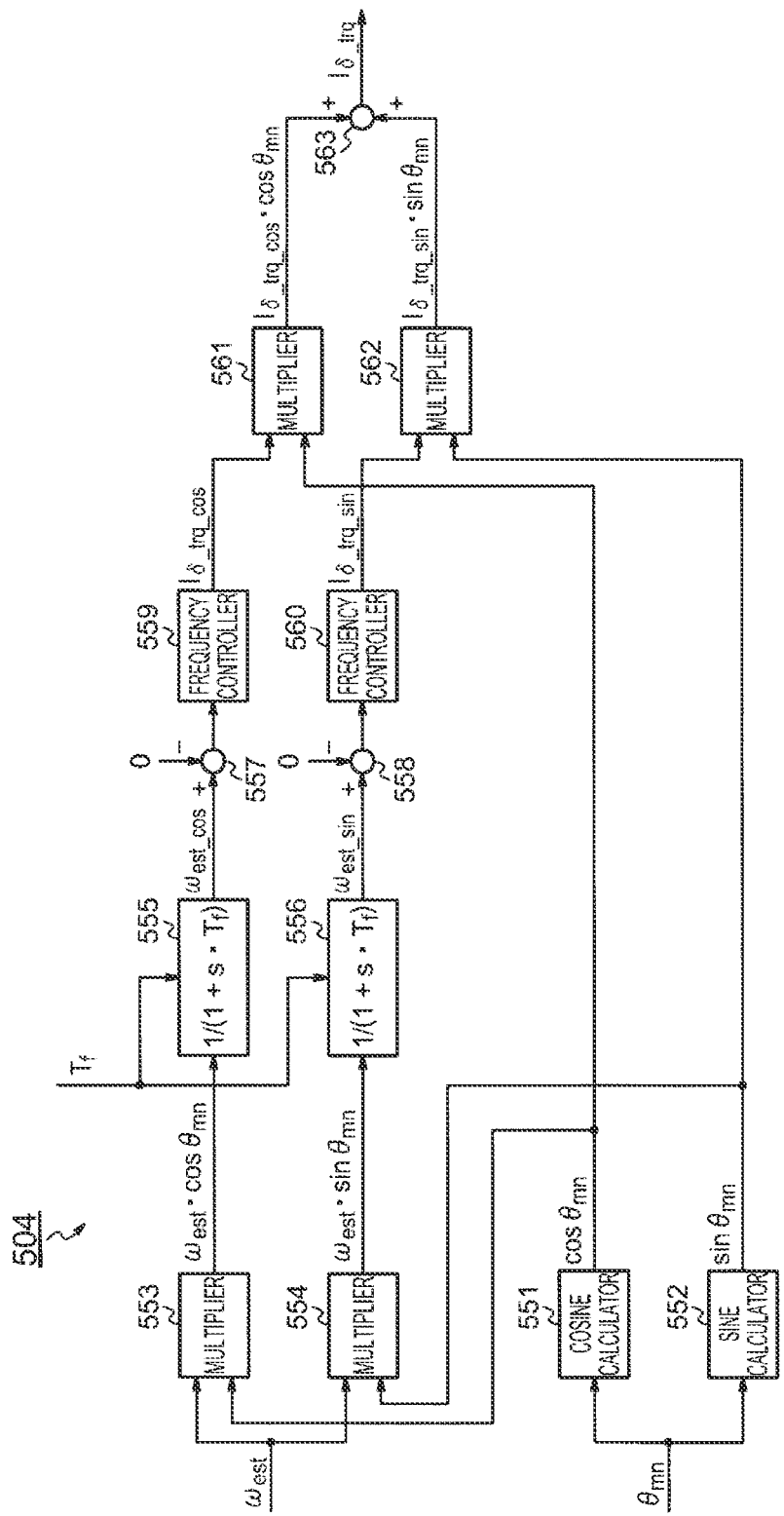
FIG. 10 is a functional block diagram illustrating an example of a configuration of a compensation value generator of FIG. 9.

The compensation value calculator 504 is configured, for example, as illustrated in FIG. 10. The illustrated compensation value calculator 504 includes a cosine calculator 551, a sine calculator 552, multipliers 553 and 554, low-pass filters 555 and 556, subtractors 557 and 558, frequency controllers 559 and 560, multipliers 561 and 562, and an adder 563.

The cosine calculator 551 receives e, and calculates a cosine cos $\theta_{mn}$ thereof. The sine calculator 552 receives $\theta_{mn}$ and calculates a sine sin $\theta_{mn}$ thereof.

The multiplier 553 multiplies the estimated value $\omega_{est}$ by cos $\theta_{mn}$, thereby determining a cosine component $\omega_{est} \cdot \cos \theta_{mn}$ of the estimated value $\omega_{est}$.

The multiplier 554 multiplies the estimated value $\omega_{est}$ by sin $\theta_{mn}$, thereby determining a sine component $\omega_{est} \cdot \sin \theta_{mn}$ of the estimated value $\omega_{est}$.

The cosine component $\omega_{est} \cdot \cos \theta_{mn}$ and sine component $\omega_{est} \cdot \sin \theta_{mn}$ calculated by the multipliers 553 and 554 include, besides ripple components at a frequency of $\omega_{mn}$, ripple components (harmonic components) at frequencies higher than $\omega_{mn}$.

The low-pass filters 555 and 556 are first-order lag filters whose transfer functions are represented by $1/(1+sT_f)$.

Here, s is the Laplace operator. $T_f$ is the time constant, and is determined to remove (sufficiently attenuate) ripple components at frequencies higher than the frequency won.

The time constant $T_f$ is determined in the operation controller 102 as described regarding the low-pass filters 409 and 410, and provided to the low-pass filters 555 and 556.

The low-pass filter 555 performs low-pass filtering on the cosine component $\omega_{est} \cdot \cos \theta_{mn}$ to remove ripple components at frequencies higher than the frequency $\omega_{mn}$, and outputs a low-frequency component West cos. The low-frequency component $\omega_{est\_cos}$ is a DC quantity representing a cosine component at a frequency of $\omega_{mn}$ of the ripple components of the estimated value $\omega_{est}$.

The low-pass filter 556 performs low-pass filtering on the sine component $\omega_{est} \cdot \sin \theta_{mn}$ to remove ripple components at frequencies higher than the frequency $\omega_{mn}$, and outputs a low-frequency component $\omega_{est\_sin}$. The low-frequency component est in is a DC quantity representing a sine component at a frequency of $\omega_{mn}$ of the ripple components of the estimated value $\omega_{est}$.

The subtractor 557 determines a difference between the output $\omega_{est\_cos}$ of the low-pass filter 555 and 0.

The subtractor 558 determines a difference between the output $\omega_{est\_sin}$ of the low-pass filter 556 and 0.

The frequency controller 559 performs proportional integral (PI) calculation on the difference $(\omega_{est\_cos}-0)$ determined by the subtractor 557 to determine a cosine component $I_{\delta\_trq\_cos}$ of the current command value to bring the difference closer to zero. By generating the cosine component $I_{\delta\_trq\_cos}$ in this manner, control to make the low-frequency component West cos coincide with 0 is performed.

The frequency controller 560 performs proportional integral (PI) calculation on the difference $(\omega_{est\_sin}-0)$ determined by the subtractor 558 to determine a sine component $I_{\delta\_trq\_sin}$ of the current command value to bring the difference closer to zero. By generating the sine component $I_{\delta\_trq\_sin}$ in this manner, control to make the low-frequency component $\omega_{est\_sin}$ coincide with 0 is performed.

The multiplier 561 multiplies the output $I_{\delta\_trq\_cos}$ of the frequency controller 559 by $\cos \theta_{mn}$, thereby generating $I_{\delta\_trq\_cos} \cdot \cos \theta_{mn}$. $I_{\delta\_trq\_cos} \cdot \cos \theta_{mn}$ is an AC component having the frequency $n \cdot \omega_{est}$.

The multiplier 562 multiplies the output $I_{\delta\_trq\_sin}$ of the frequency controller 560 by $\sin \theta_{mn}$, thereby generating $I_{\delta\_trq\_sin} \cdot \sin \theta_{mn}$. $I_{\delta\_trq\_sin} \cdot \sin \theta_{mn}$ is an AC component having the frequency $n \cdot \omega_{est}$.

The adder 563 determines a sum of the output $I_{\delta\_trq\_cos} \cdot \cos \theta_{mn}$ of the multiplier 561 and the output $I_{\delta\_trq\_sin} \cdot \sin \theta_{mn}$ of the multiplier 562.

The output of the adder 563 is output as the torque current compensation value $I_{\delta\_trq}$.

By adding the torque current compensation value $I_{\delta\_trq}$ thus determined in the adder 505 of FIG. 9 and using the result of the addition as the corrected torque current command value $I_\delta^{**}$, it is possible to reduce the ripple component.

In a state in which the ripple component is reduced, the output torque $T_m$ can be considered to be equal to the load torque $T_l$, as described above. Thus, the zero current control is performed during a period including a phase at which the output torque $T_m$ is at a minimum, and switching of the connection of the motor 7 is performed during the period during which the zero current control is performed.

The following describes advantages of performing the zero current control and performing the switching during it, and advantages of performing the zero current control at the minimum torque phase.

First, a description will be made on an operation of the motor driving apparatus 2 when the connection switching device 60 is operated while the motor is being operated.

First, a problem of prior art, or an operation of a motor driving apparatus without features of the present invention will be described with reference to FIG. 4.

While the motor is being operated, i.e., while current is flowing through the switches 61, 62, and 63 constituting the connection switching device 60, when the currents flowing through the exciting coils 611, 621, and 631 (FIG. 5) are operated (turned from off to on or from on to off), the connections of the common contacts 61c, 62c, and 63c are switched to the normally closed contacts 61b, 62b, and 63b or normally open contacts 61a, 62a, and 63a. If power is being supplied from the inverter 30 to the motor 7 at the time of the switching, arcing may occur between the contacts of the switches 61 to 63, thereby causing failures, such as contact welding.

To avoid such failures, it is conceivable to stop the power supply from the inverter 30 to the motor 7 and bring the rotational speed $N_m$ of the motor 7 to zero prior to operating the connection switching device 60. This makes it possible to perform the switching without causing arcing between the contacts of the switches 61 to 63.

However, when the rotational speed $N_m$ of the motor 7 is brought to zero, the torque required for the restart is increased, which may increase the current during the start or prevent the restart.

For example, in a case where the motor 7 drives the compressor 904, immediately after the rotational speed $N_m$ is brought to zero, the state of the refrigerant is unstable, and thus the torque required for the restart is increased.

It is conceivable to perform the restart after a time required for the state of the refrigerant to become sufficiently stable elapses after the rotational speed $N_m$ of the motor 7 is brought to zero. In this case, it becomes impossible to compress the refrigerant with the compressor 904, and the room temperature may greatly deviate from the desired temperature due to reduction in the cooling capacity or heating capacity.

By causing the connection switching device 60 to perform the switching operation while controlling the current flowing through the connection switching device 60 to be zero, it is possible to prevent arcing from occurring between the contacts of the switches 61 to 63 during the switching.

This eliminates the need to bring the rotational speed $N_m$ of the motor 7 to zero for the switching.

The current flowing through the connection switching device 60 can be brought to zero by bringing the current flowing through the motor 7 to zero.

The current flowing through the motor 7 can be brought to zero by selecting the values 0 in the selectors 507 and 508 illustrated in FIG. 9 and supplying them as the selected command values $I_\delta^{*}$ and $I_\gamma^{}$ to the current controllers 511 and 512 through the subtractors 509 and 510.

Thereby, the current controller 511 outputs the γ-axis voltage command value $V_\gamma^*$ to make the excitation current $I_\gamma$ coincide with 0, and the current controller 512 outputs the δ-axis voltage command value $V_\delta^*$ to make the torque current $I_\delta$ coincide with 0.

In performing the above zero current control, the following should be noted.

The following equation (10) represents a relationship between the output torque $T_m$, the load torque $T_l$, and the speed change:

$$\Delta\omega = \left(\frac{T_m - T_l}{J_m}\right) \times \Delta t. \tag{10}$$

In equation (10),
$\Delta\omega$ is a change in the speed,
$J_m$ is the inertia moment, and
$\Delta t$ is a change in time.

Equation (10) shows that when $(T_m - T_l)$ is negative, as the absolute value thereof increases, the decrease in the speed per unit time increases.

When the zero current control is performed, since the output torque $T_m$ is zero during the period of the zero current control, the decrease in the speed increases as the length of the period of the zero current control increases and as the load torque $T_l$ increases. Thus, when the zero current control is performed at low speed, depending on the length of the period of the zero current control, it is possible that the rotational frequency greatly decreases, e.g., to near zero, causing step-out.

To prevent such a problem from occurring, this embodiment estimates a phase (minimum torque phase) at which the load torque $T_l$ is at a minimum, and performs the zero current control during a period including the estimated minimum torque phase. Thereby, it is possible to reduce the probability that the rotational frequency greatly decreases, e.g., to near zero.

The speed variation and the like at the time of performing the zero current control will be described with reference to FIGS. 11A to 11E and FIGS. 12A to 12E, by assuming, as an example, the load torque of a single rotary compressor. In FIGS. 11A to 11E and FIGS. 12A to 12E, the horizontal axis represents time (seconds).

FIGS. 11A to 11E illustrate a case where the zero current control is performed without particularly controlling the timing, and FIGS. 12A to 12E illustrate a case where the zero current control is performed during a period including the estimated minimum torque phase.

Figure 11A:
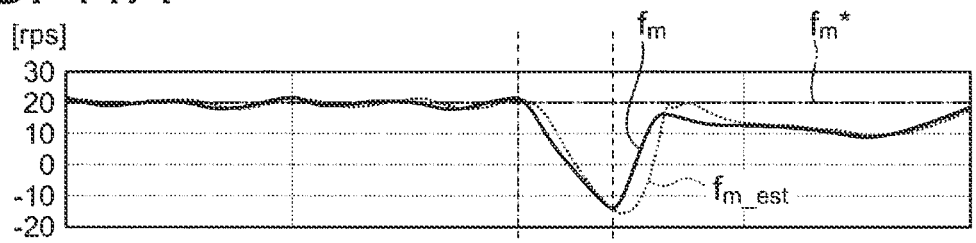
FIGS. 11A to 11E are graphs illustrating an example of variations in rotational speed and the like while switching is performed with zero current control.

FIGS. 11A and 12A each illustrate a rotational frequency command value $f_m^*$ with a dot-dash line, the actual speed $f_m$, which is the rotational frequency, with a solid line, and an estimated value $f_{m\_est}$ of the rotational frequency with a dotted line.

They have the relationships of the following equations (11a) to (11c) with the command value $\omega^*$, actual speed $\omega$, and estimated value $\omega_{est}$ in electrical angular speed:

$$f_m^* = \left(\frac{1}{P_m}\right) \times \left(\frac{\omega^*}{2\pi}\right), \tag{11a}$$

$$f_m = \left(\frac{1}{P_m}\right) \times \left(\frac{\omega}{2\pi}\right), \tag{11b}$$

$$f_{m\_est} = \left(\frac{1}{P_m}\right) \times \left(\frac{\omega_{est}}{2\pi}\right). \tag{11c}$$

Figure 11B:
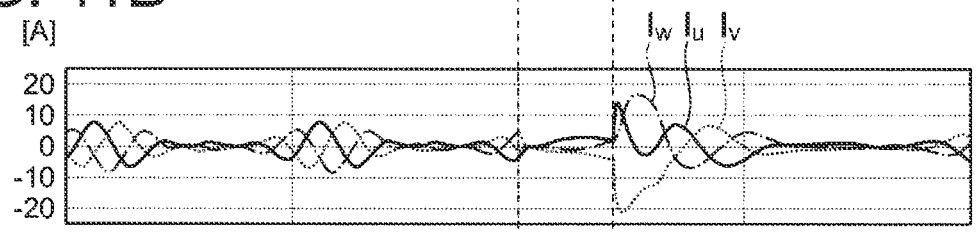

FIGS. 11B and 12B each illustrate the U-phase current $I_u$ with a solid line, the V-phase current $I_v$ with a dotted line, and the W-phase current $I_w$ with a dot-dash line.

Figure 11C:
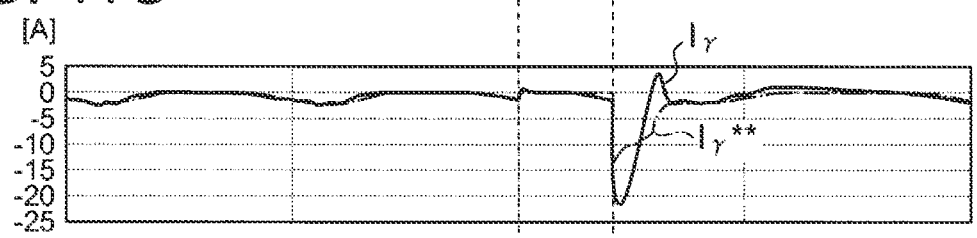

FIGS. 11C and 12C each illustrate the target value $I_\gamma^*$ of the excitation current with a dot-dash line, and the actual excitation current $I_\gamma$ with a solid line.

Figure 11D:
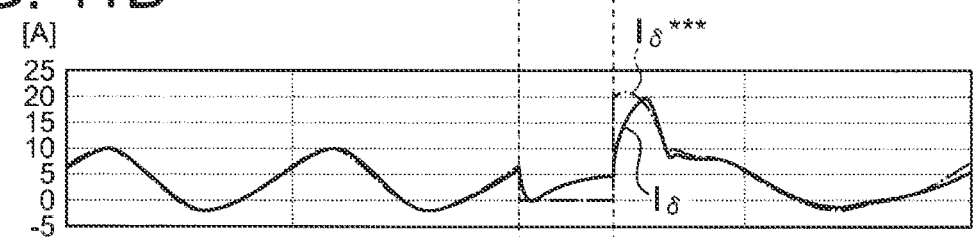

FIGS. 11D and 12D each illustrate the target value $I_\delta^{***}$ of the torque current with a dot-dash line, and the actual torque current $I_\delta$ with a solid line.

Figure 11E:
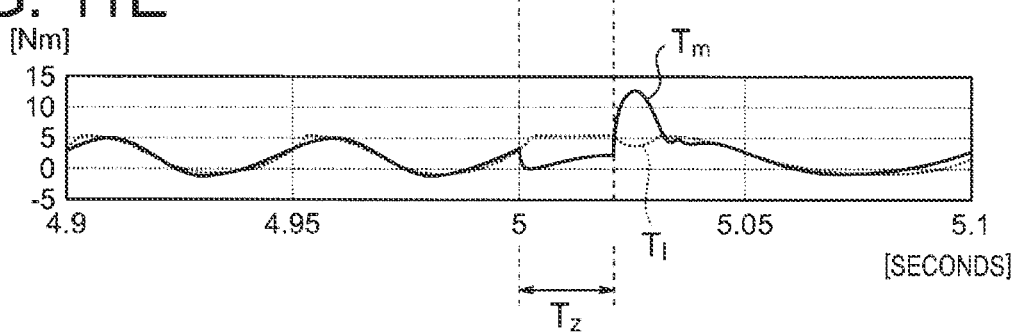

FIGS. 11E and 12E each illustrate the output torque $T_m$ with a solid line, and the load torque $T_l$ with a dotted line.

As can be seen from FIGS. 11E and 12E, it is assumed that a ripple of the load torque $T_l$ has a period of 0.05 seconds, and thus has a frequency of 20 Hz.

When the time to perform the zero current control is not limited, the zero current control may be performed at a phase other than the phase (estimated minimum torque phase) at which the load torque $T_l$ is estimated to be at a minimum, for example, as illustrated in FIG. 11E. In the case of FIG. 11A, the actual speed $f_m$ is decreased and reversed, which is undesirable.

On the other hand, when the zero current control is performed during a period including the phase (estimated minimum torque phase) at which the load torque $T_l$ is estimated to be at a minimum, it can be seen that there is little decrease in the actual speed $f_m$, as shown in FIG. 12A.

In this embodiment, as described above, the minimum torque phase calculator 104 determines the output torque $T_m$, determines the low-frequency components $T_{mcos}$ and $T_{msin}$ from $T_m$, and determines the phase $\theta_{mn\_min}$ at which the nth ripple component of the estimated load torque is at a minimum, from $T_{mcos}$ and $T_{msin}$ according to equation (9).

The reason why the phase $\theta_{mn\_min}$ at which the nth ripple component of the estimated load torque is at a minimum can be determined in the above-described manner will be described below.

In a situation in which vibration suppression control to suppress the speed ripple is ideally performed (a state in which the speed variation is suppressed), the output torque $T_m$ has the same phase and amplitude as the load torque $T_l$, and the phase at which the output torque $T_m$ is at a minimum coincides with the phase at which the load torque $T_l$ is at a minimum.

Thus, when a state in which the output torque $T_m$ has the same phase and amplitude as the load torque $T_l$ is established by performing the vibration suppression control, it is possible to estimate a phase at which the load torque $T_l$ is at a minimum, from a phase at which the output torque $T_m$ is at a minimum, in this state.

In the case of a motor having small reluctance torque, the phase at which the torque current is at a minimum and the phase at which the load torque is at a minimum also generally coincide with each other. Thus, when the output torque is at a minimum, the torque current is also at or near a minimum value, and the phase currents are also at or near minimum values. Thus, by performing switching to the zero current control in a period including the phase at which the output torque is at a minimum, it is possible to avoid a sudden current change at the time of the switching.

The output torque $T_m$ is given by the above equation (5).

For example, when vibration suppression control to compensate only a ripple component at a frequency that is n times the rotational frequency of the motor 7 is being performed, the output torque $T_m$ given by equation (5) is considered to include a DC component and an AC component (nth ripple component), and thus equation (5) can be transformed as shown in the following equation (12):

$$T_m = T_{mDC} + T_{mcos}\cos(\theta_{mn}) + T_{msin}\sin(\theta_{mn}). \tag{12}$$

$T_{mDC}$ is a DC component of the torque $T_m$, $T_{mcos}$ is an amplitude of a cosine component of the nth ripple component of the torque $T_m$, and $T_{msin}$ is an amplitude of a sine component of the nth ripple component of the torque $T_m$.

Equation (12) can be transformed as shown in the following equation (13):

$$T_m = T_{mDC} + \sqrt{T_{mcos}^2 + T_{msin}^2} \cos\left[\theta_{mn} - \tan^{-1}\left(\frac{T_{msin}}{T_{mcos}}\right)\right]. \quad (13)$$

$T_{mcos}$ and $T_{msin}$ are DC quantities, and may slowly vary with time, but do not vary with a period comparable to that of variation of $\theta_m$. Thus, the output torque $T_m$ given by equation (13) is at a minimum when the cosine function represented by the following equation (14) is at a minimum:

$$\cos\left[\theta_{mn} - \tan^{-1}\left(\frac{T_{msin}}{T_{mcos}}\right)\right]. \quad (14)$$

The cosine function of equation (14) is at a minimum when its phase is π.

That is, when the following equation (15) is satisfied, the cosine function represented by equation (14) is at a minimum:

$$\theta_{mn} - \tan^{-1}\left(\frac{T_{msin}}{T_{mcos}}\right) = \pi. \quad (15)$$

When $\theta_{mn}$ at which equation (15) is satisfied is denoted by $\theta_{mn\_min}$, the above-described equation (9) is obtained.

Thus, it can be seen that the phase $\theta_{mn\_min}$ determined by the above-described equation (9) is a phase at which the nth ripple component of the estimated load torque is at a minimum.

By performing the zero current control during the period Tz including the phase $\theta_{mn\_min}$ at which the nth ripple component of the estimated load torque is at a minimum, the phase currents $I_u$, $I_v$, and $I_w$ (FIG. 12B), i.e., the currents flowing through the motor 7 and switches 61, 62, and 63, can be brought to near zero during the period Tz.

Then, by switching the switches 61, 62, and 63 during the period Tz, the switching can be performed while no current is flowing through the switches 61, 62, and 63.

As a result, arching is prevented from occurring between the contacts, and thus it is possible to prevent contact welding when a mechanical relay is used, and provide a reliable motor driving apparatus.

Moreover, by switching the switches 61, 62, and 63 during the zero current control, it is possible to perform the switching without a large current change. Thus, it is possible to prevent the rotational frequency of the motor 7 from changing suddenly due to the switching, and it is possible to switch the connection state while preventing noise, vibration, or the like.

Although as a method to bring the current to 0, there is also a method of stopping the output of the PWM signals Sm1 to Sm6, the motor 7 continues to generate a back electromotive force depending on the rotational frequency $N_m$. When the back electromotive force is higher than the bus voltage (i.e., the voltage between both electrodes of the capacitor 20), it acts as a regenerative voltage, and a charging current flows from the motor 7 toward the capacitor 20 through the connection switching device 60 and rectifier elements 321 to 326. In this state, when the connection switching device 60 operates and causes the switching, arcing may occur. Also in this case, failures, such as contact welding, may occur.

On the other hand, in this embodiment, when the motor is rotating, the current flowing through the motor 7 and connection switching device 60 is controlled to be zero, and control is performed so that the connection switching device 60 is switched in this state. Thereby, it is possible to prevent noise, vibration, or the like from occurring due to a current change at the time of the switching, prevent failures, such as contact welding, when a mechanical relay is used in the connection switching device 60, and provide a reliable motor driving apparatus.

Also, in this embodiment, by performing the zero current control during the period Tz including the minimum torque phase $\theta_{mn\_min}$, it is possible to reduce the decrease in rotational speed of the motor 7 during the period during which the zero current control is performed.

Next, a relationship between the phase $\theta_{mn\_min}$ at which the nth ripple component is at a minimum and the period Ty during which the torque stays at or near a minimum value will be described.

Depending on characteristics of the load element, the load torque may include not only the nth ripple component but also components, in particular harmonic components, other than the nth ripple component. The length of the period during which the torque stays near a minimum value depends on the included harmonics.

Figure 13:
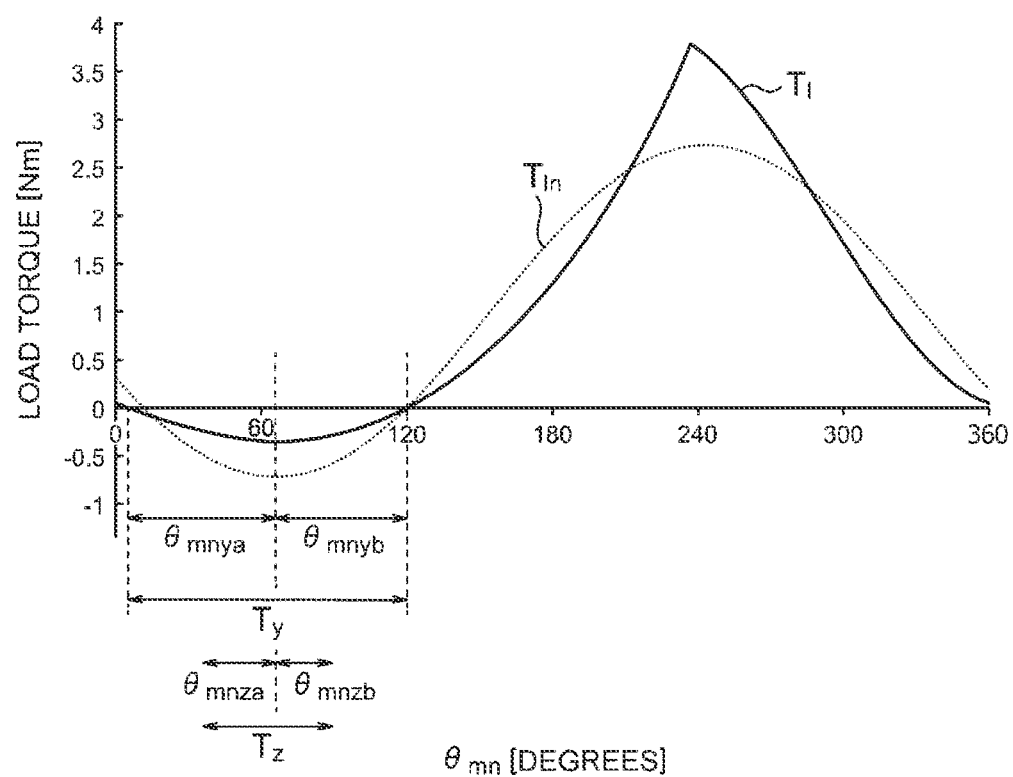
FIG. 13 is a diagram illustrating an example of a relationship between a phase at which an nth ripple component of a load torque is at a minimum and a period during which the load torque stays at or near a minimum value.

FIG. 13 illustrates an example of the load torque $T_l$ and the nth ripple component $T_{ln}$ thereof. The horizontal axis is the phase $\theta_{mn}$ with one cycle of the nth ripple component $T_{ln}$ as 360 degrees.

In the illustrated example, the torque $T_l$ is at or near a minimum during a period Ty from an angle $\theta_{mnya}$ before to an angle $\theta_{mnyb}$ after the phase $\theta_{mn\_min}$ at which the nth ripple component $T_{ln}$ is at a minimum.

Specifically, the $\theta_{mn\_min}$ at which the nth ripple component $T_{ln}$ is at a minimum is 62 degrees, and the phase at which the torque $T_l$ is at a minimum coincides with the phase $\theta_{mn\_min}$ at which the nth ripple component $T_{ln}$ is at a minimum.

During the period Ty from 2 degrees to 120 degrees, the torque $T_l$ is negative and stays at or near a minimum value of the torque. Thus, during the period Ty from the angle $\theta_{mnya}$=60 degrees before to the angle $\theta_{mnyb}$=58 degrees after the phase $\theta_{mn\_min}$ (=62 degrees) at which the nth ripple component $T_{ln}$ is at a minimum, the torque $T_l$ is at or near a minimum value.

In such a case, the zero current control may be continued during the entire period Ty, or may be continued during a part of the period Ty. The period during which the zero current control is performed is denoted by the symbol Tz.

The switching should be performed during the period Tz during which the zero current control is performed.

The period Tz during which the zero current control is performed occupies the whole or a part of the period Ty, and is, for example, a period from an angle $\theta_{mnza}$ before to an angle $\theta_{mnzb}$ after the phase $\theta_{mn\_min}$ at which the nth ripple component $T_{ln}$ is at a minimum. The period corresponding to the angle $\theta_{mnza}$ will be referred to as the first period, and the period corresponding to the angle $\theta_{mnzb}$ will be referred to as the second period.

The angles $\theta_{mnza}$ and $\theta_{mnzb}$ defining the period Tz are angles with one cycle of the nth ripple component as 360 degrees. The example illustrated in FIG. 13 is a case of n=1, and the angles $\theta_{mnza}$ and $\theta_{mnzb}$ are equal to angles $\theta_{mza}$ and $\theta_{mzb}$ in mechanical angle.

When n is not 1, $\theta_{mnza}$, $\theta_{mnzb}$, $\theta_{mza}$, and $\theta_{mzb}$ have the relationships of the following equations (16a) and (16b):

$$\theta_{mnza} = \frac{\theta_{mza}}{n}, \quad (16a)$$

$$\theta_{mnzb} = \frac{\theta_{mzb}}{n}. \quad (16b)$$

Thus, when the period Tz is represented with mechanical angles, $\theta_{mza}/n$ and $\theta_{mzb}/n$ need to be used instead of $\theta_{mnza}$ and $\theta_{mnzb}$ described above.

For example, the above first period is a value obtained by dividing a first mechanical angle $\theta_{mza}$ by n, and the above second period is a value obtained by dividing a second mechanical angle $\theta_{mzb}$ by n.

In the above example, in the minimum torque phase calculator 104, the phase at which the torque is at a minimum (the phase at which the nth ripple component of the torque is at a minimum) is calculated by the calculation represented by equation (9). Alternatively, the phase at which the load torque is at a minimum may be estimated from a history of variation of the output torque $T_m$.

Figure 14:
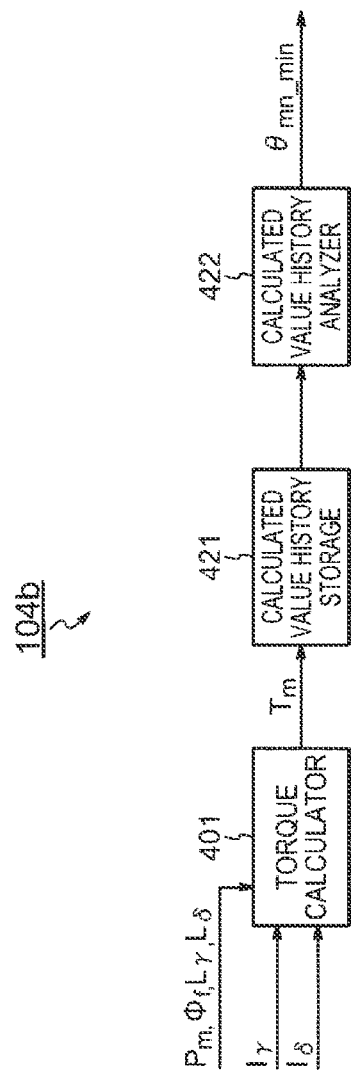
FIG. 14 is a functional block diagram illustrating a modification of the minimum torque phase calculator of FIG. 7.

An example of a configuration in this case is illustrated in FIG. 14.

The illustrated minimum torque phase calculator 104b includes a torque calculator 401, a calculated value history storage 421, and a calculated value history analyzer 422.

The torque calculator 401 calculates the output torque $T_m$, for example, by performing the calculation represented by equation (5), as with the torque calculator 401 of FIG. 8. The calculation of the output torque $T_m$ is performed at each sampling time with a predetermined period.

Figure 15:
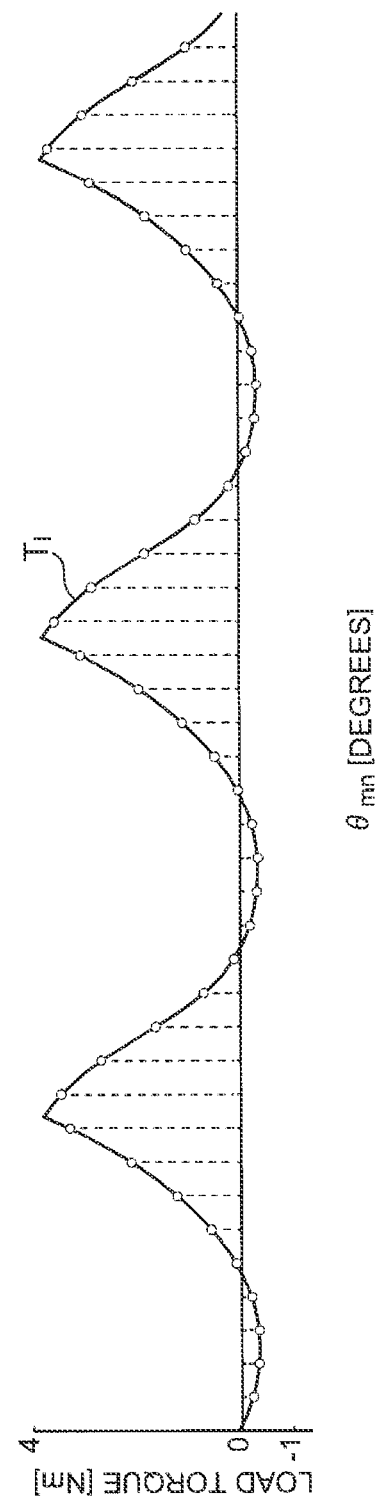
FIG. 15 is a diagram illustrating an example of a history of torque calculated values calculated by a torque calculator of FIG. 14.

The calculated value history storage 421 stores the value (calculated value) of the output torque $T_m$ calculated at each sampling time by the torque calculator 401 and generates a time series of the stored values. For example, it stores the last values for a predetermined number of cycles. The "cycles" here refers to cycles of the nth ripple component of the torque. FIG. 15 illustrates an example of a waveform representing the stored time series. In FIG. 15, the white circles indicate sampled values of the output torque. In the illustrated example, the time series is formed by values for three cycles.

The calculated value history analyzer 422 determines, from the above time series, a phase (minimum torque phase) at which the output torque $T_m$ is at a minimum in each cycle.

Each sampling time is associated with the phase $\theta_e$ calculated by the electrical phase calculator 116 of FIG. 7, for example, and $\theta_e$ and $\theta_{mn}$ have the relationship:

$$\theta_{mn} = \frac{n \times \theta_e}{P_m}. \quad (17)$$

Thus, for example, in each cycle, $\theta_{mn\_min}$ can be determined by multiplying, by $n/P_m$, the phase $\theta_e$ associated with a sampling time at which the calculated value of the output torque $T_m$ is determined to be at a minimum.

The length of each cycle can be determined on the basis of the variation of the calculated output torque value. For example, it can be calculated on the basis of one or both of the time from an occurrence of a minimum value to an occurrence of the next minimum value and the time from an occurrence of a maximum value to an occurrence of the next maximum value.

In each cycle, in determining the minimum torque phase, a correction may be made on the basis of the minimum torque phase(s) determined for preceding one or more cycles. For example, for each cycle, it is possible to determine, as the minimum torque phase in the cycle, a weighted average of a minimum torque phase determined on the basis of only the calculated values in the cycle (the torque values calculated at the sampling times in the cycle) and minimum torque phase(s) determined for each of preceding one or more cycles on the basis of only the calculated values in the cycle.

In each cycle, in the weighting, the minimum torque phase determined on the basis of only the calculated values in the cycle may be given the highest weight. Also, for the other cycles, cycles closer to the cycle may be given higher weights.

In the above example, a phase at which the output torque is at a minimum is calculated. Alternatively, it is possible to calculate a phase at which the torque current is at a minimum and use the calculated phase as a phase at which the load torque is at a minimum.

In the above example, the zero current control is performed during a period including a phase at which the load torque is at a minimum (minimum value) in each cycle. Alternatively, it is possible to perform the zero current control during a period including a phase at which the load torque is near a minimum value in each cycle.

In short, the zero current control may be performed during a period including a phase at which the load torque is at or near a minimum value.

Also, when there is a period during which the load torque is negative, the whole or a part of the period during which the load torque is negative may be used as the above period including a phase at which the load torque is at or near a minimum value.

The above example is configured to reproduce the phase currents $I_u$, $I_v$, and $I_w$ from the DC current $I_{dc}$ on the input side of the inverter 30. Alternatively, it is possible to provide current detectors in the output lines 331, 332, and 333 of the inverter 30 and detect the phase currents with the detectors. In this case, the currents detected by the detectors can be used instead of the currents reproduced by the current reproducer 161.

Although insulated gate bipolar transistors (IGBTs) or MOSFETs are assumed as the switching elements 311 to 316 of the inverter main circuit 310, any elements capable of performing switching can be used. In the case of MOSFETs, since they have parasitic diodes due to their structures, the same effects can be obtained without connecting the free-wheeling rectifier elements (321 to 326) in antiparallel.

The material forming the switching elements 311 to 316 is not limited to silicon (Si), and by forming them with material using wide-bandgap semiconductor, such as silicon carbide (SiC), gallium nitride (GaN), or diamond, it is possible to reduce loss.

Second Embodiment

Figure 16:
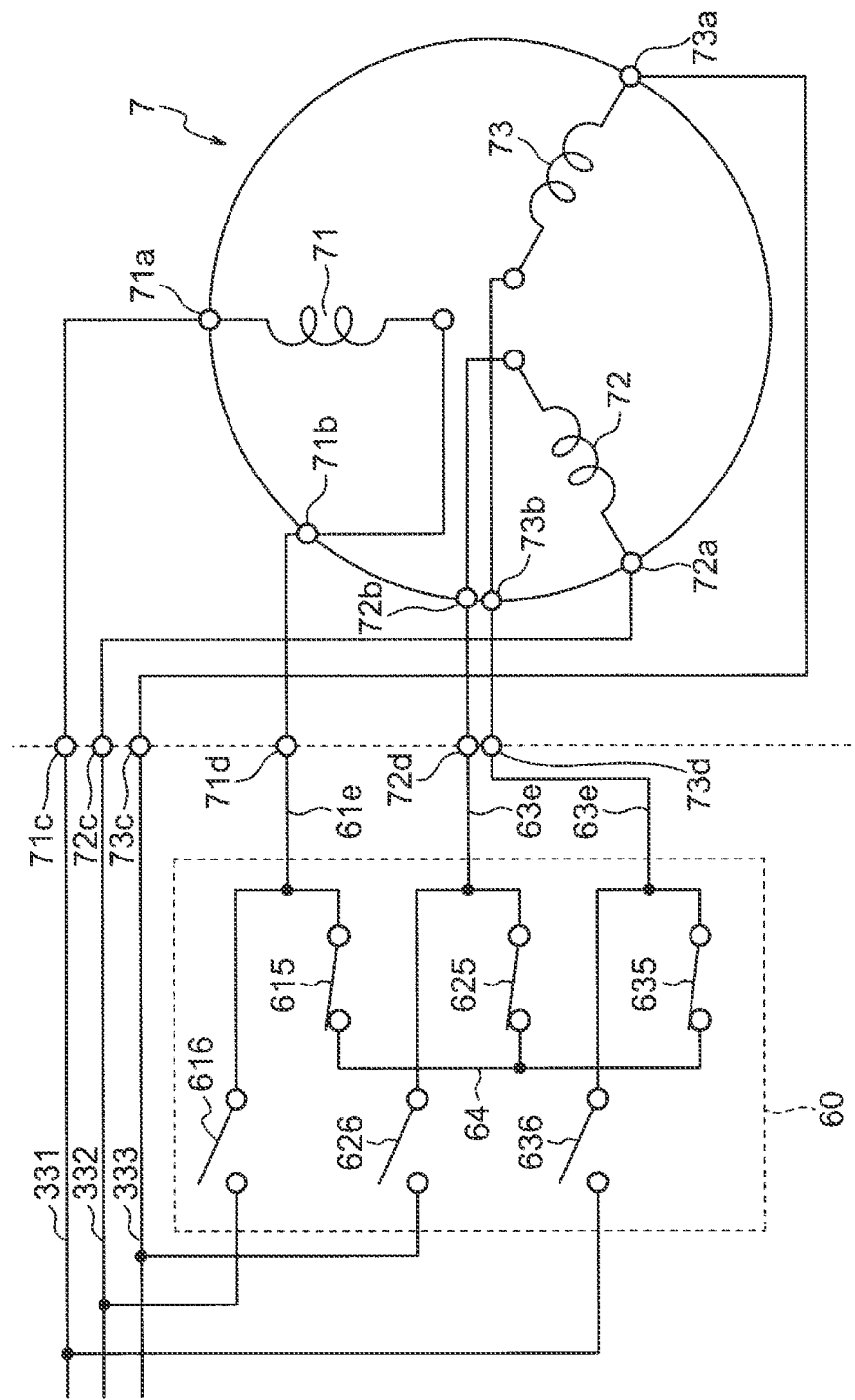
FIG. 16 is a wiring diagram illustrating windings of a motor and a connection switching device in a second embodiment of the present invention.

The configuration of FIG. 4 uses a selector switch as each of the switches 61, 62, and 63 of the connection switching device 60. Instead, each switch may be constituted by the combination of a normally closed switch and a normally open switch. FIG. 16 illustrates an example of a configuration of a connection switching device in this case.

In the configuration of FIG. 16, the combination of a normally closed switch 615 and a normally open switch 616 is used instead of the selector switch as the switch 61, the combination of a normally closed switch 625 and a normally open switch 626 is used instead of the selector switch as the switch 62, and the combination of a normally closed switch 635 and a normally open switch 636 is used instead of the selector switch as the switch 63.

As illustrated, when the normally closed switches 615, 625, and 635 are closed (on) and the normally open switches 616, 626, and 636 are open (off), the motor is in Y-connection, and contrary to the illustration, when the normally closed switches 615, 625, and 635 are open and the normally open switches 616, 626, and 636 are closed, the motor is in Δ-connection.

Even when each switch is constituted by the combination of a normally closed switch and a normally open switch as illustrated in FIG. 16, an electromagnetic contactor can be used as each switch. The electromagnetic contactor is preferable since it has low conduction loss when it is on.

When each switch is constituted by the combination of a normally closed switch and a normally open switch as illustrated in FIG. 16, it is possible to use, as each switch, a semiconductor switch formed by wide-bandgap semiconductor (WBG semiconductor) made of silicon carbide (SiC), gallium nitride (GaN), gallium oxide ($Ga_2O_3$), diamond, or the like. These have low on-resistance, low loss, and low heat generation. Also, these can be quickly switched.

Also in the case of using semiconductor switches as described above, the switching operation can be performed quickly. However, the semiconductor devices have an operation variation of about a few microseconds. Thus, when a time constant L/R based on a winding resistance R and a winding inductance L of the motor 7 is very small, a sudden current change may occur, which not only may cause a sudden change in the rotational frequency of the motor 7 and cause vibration, noise, or the like, but also may cause the semiconductor devices to generate heat and cause thermal destruction of the semiconductor devices.

Thus, in the connection switching device 60 formed by semiconductor devices, employing the zero current control makes it possible to perform the switching without a large current change. This makes it possible to prevent the rotational frequency of the motor 7 from suddenly changing due to the switching and to switch the connection state while preventing noise and vibration. Further, there is provided an advantage that it is possible to prevent the semiconductor devices from generating heat and thereby prevent destruction of the semiconductor devices.

Third Embodiment

The first and second embodiments assume that the motor can have the connection of the stator windings switched to Y-connection or Δ-connection.

The motor may be such that the connection is switched in another manner.

For example, the motor may be one that includes, as the winding of each phase, a winding constituted by two or more winding portions, and that can be switched to one of parallel connection and series connection.

In this case, both ends of each of the two or more winding portions constituting the winding of each phase are configured to be connectable to the outside of the motor 7, and the connection state is switched by a connection switching device 60.

Figure 17:
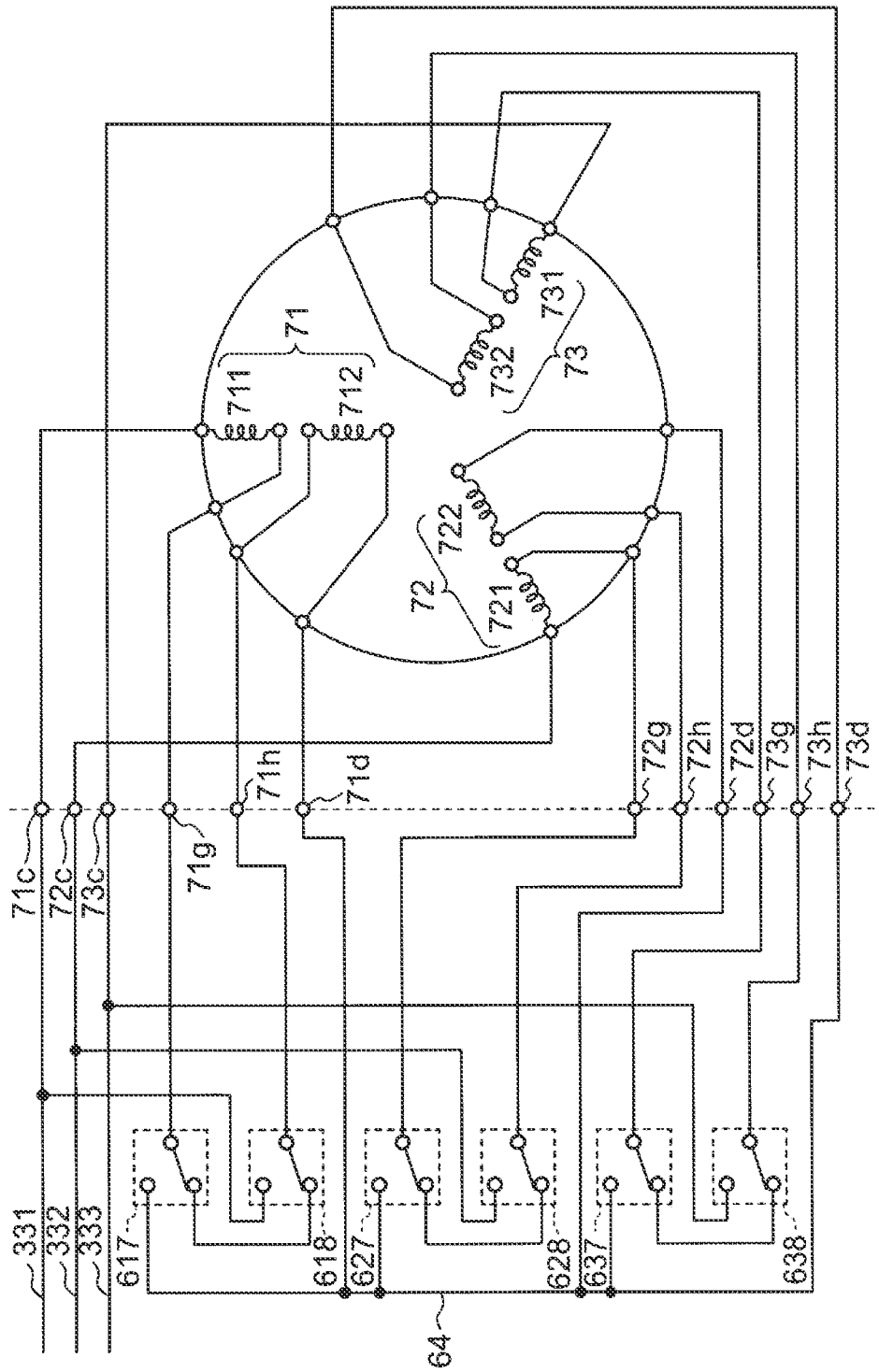
FIG. 17 is a wiring diagram illustrating windings of a motor and a connection switching device in a third embodiment of the present invention.

FIG. 17 illustrates a configuration in which the winding of each phase of a motor in Y-connection is constituted by two winding portions, both ends of each of the winding portions are connectable to the outside of the motor 7, and the connection state is switched by the connection switching device 60.

Specifically, a U-phase winding 71 is constituted by two winding portions 711 and 712, a V-phase winding 72 is constituted by two winding portions 721 and 722, and a W-phase winding 73 is constituted by two winding portions 731 and 732.

First ends of the winding portions 711, 721, and 731 are connected to the output lines 331, 332, and 333 of the inverter 30 through external terminals 71c, 72c, and 73c.

Second ends of the winding portions 711, 721, and 731 are connected to common contacts of selector switches 617, 627, and 637 through external terminals 71g, 72g, and 73g.

First ends of the winding portions 712, 722, and 732 are connected to common contacts of selector switches 618, 628, and 638 through external terminals 71h, 72h, and 73h.

Second ends of the winding portions 712, 722, and 732 are connected to a neutral node 64 through external terminals 71d, 72d, and 73d.

Normally closed contacts of the selector switches 617, 627, and 637 are connected to normally closed contacts of the selector switches 618, 628, and 638.

Normally open contacts of the selector switches 617, 627, and 637 are connected to the neutral node 64.

Normally open contacts of the selector switches 618, 628, and 638 are connected to the output lines 331, 332, and 333 of the inverter 30.

The selector switches 617, 627, 637, 618, 628, and 638 constitute the connection switching device 60.

Even when such a connection switching device is used, the connection switching device 60 can be protected as described in the first and second embodiments.

In the case of the configuration illustrated in FIG. 17, when the selector switches 617, 627, 637, 618, 628, and 638 are switched to the normally closed contact sides as illustrated, the motor is in a state of series connection, and when the selector switches 617, 627, 637, 618, 628, and 638 are switched to the normally open contact sides contrary to the illustration, the motor is in a state of parallel connection.

Also in the third embodiment, it is possible to use the combination of a normally closed switch and a normally open switch instead of each selector switch, as described in the second embodiment.

Although the above describes a case in which a motor in Y-connection is switched between series connection and parallel connection, the motor may be in Δ-connection and switched between series connection and parallel connection.

Although the above describes a configuration in which the windings of the respective phases in Y-connection or Δ-connection are switched to series connection or parallel connection, a configuration is also possible in which intermediate taps are provided in the windings in Y-connection or Δ-connection and a voltage required for driving is changed by short-circuiting part of the windings by switching means.

In short, it is sufficient that the motor be one in which the connection of the windings can be switched.

The configurations described in the above embodiments are examples of configurations of the present invention, and may be combined with other known techniques, and may be modified, e.g., by partial omission, without departing from the gist of the present invention.

INDUSTRIAL APPLICABILITY

As above, the present invention is suitable for a motor driving apparatus that switches and uses windings of a motor, and refrigeration cycle equipment provided therewith.

Although an air conditioner has been taken as an example of the refrigeration cycle equipment, the present invention is not limited to this, and is also applicable to, for example, a refrigerator, a freezer, a heat pump water heater, and the like.

The invention claimed is:

1. A motor driving apparatus comprising:
   a motor to drive a load element having a load torque that varies periodically, the motor having a connection;
   a connection switching device to switch the connection of the motor;
   an inverter to apply an alternating-current voltage of variable frequency and variable voltage value to the motor; and
   a control device to control the inverter and the connection switching device,
   wherein the control device
      controls the inverter so that an output torque of the motor follows periodical variation of the load torque, and
      controls the inverter so that a current flowing through the motor is zero during a period including a minimum torque phase at which the load torque is at or near a minimum value, and causes the connection switching device to switch the connection during the period during which the inverter is controlled so that the current flowing through the motor is zero.

2. The motor driving apparatus of claim 1, wherein the control device generates a torque current compensation value for causing the output torque of the motor to follow the periodical variation of the load torque, corrects a torque current command value on a basis of the generated torque current compensation value, generates a voltage command value on a basis of the corrected torque current command value, and controls the inverter on a basis of the generated voltage command value.

3. The motor driving apparatus of claim 2, wherein the control device calculates the output torque of the motor, uses the calculated output torque as an estimated value of the load torque, and detects the minimum torque phase on a basis of the estimated value.

4. The motor driving apparatus of claim 2, wherein when a component at a frequency that is n times a rotational frequency of the motor is largest of periodically varying components of the load torque, the torque current compensation value is for mainly compensating the component at the n-times frequency.

5. The motor driving apparatus of claim 4, wherein the control device detects, as the minimum torque phase, a phase at which the component at the n-times frequency of the periodically varying components of the load torque is at a minimum value.

6. The motor driving apparatus of claim 5, wherein the control device calculates the output torque of the motor, extracts a component at the n-times frequency from the calculated output torque, and detects a phase at which the extracted component is at a minimum value, as the phase at which the component at the n-times frequency of the load torque is at a minimum value.

7. The motor driving apparatus of claim 6, wherein the period including the minimum torque phase is a period from a first period before to a second period after the phase at which the component at the n-times frequency is at a minimum value.

8. The motor driving apparatus of claim 7, wherein
   the first period is an angle obtained by dividing a predetermined first mechanical angle by n, and
   the second period is an angle obtained by dividing a predetermined second mechanical angle by n.

9. The motor driving apparatus of claim 1, wherein the connection switching device includes an electromagnetic contactor including an exciting coil and a contact driven by current flowing through the exciting coil.

10. The motor driving apparatus of claim 1, wherein the connection switching device includes a semiconductor switch controlled by a signal input to a control terminal.

11. The motor driving apparatus of claim 10, wherein the semiconductor switch is formed by wide-bandgap semiconductor.

12. Refrigeration cycle equipment comprising the motor driving apparatus of claim 1.

* * * * *